US012719926B2

(12) United States Patent
Davidson et al.

(10) Patent No.: US 12,719,926 B2
(45) Date of Patent: Aug. 25, 2026

(54) PHISHING DETECTION OF VISUALLY SIMILAR LOGIN PAGES

(71) Applicant: Walmart Apollo, LLC, Bentonville, AR (US)

(72) Inventors: Jayson Lee Davidson, Rogers, AR (US); Dan Cheng, Catonsville, MD (US); Connor Joseph Shride, Portland, OR (US); Walter Nolen Scaife, Longmont, CO (US)

(73) Assignee: Walmart Apollo, LLC, Bentonville, AR (US)

( * ) Notice: Subject to any disclaimer, the term of this patent is extended or adjusted under 35 U.S.C. 154(b) by 290 days.

(21) Appl. No.: 18/428,072

(22) Filed: Jan. 31, 2024

(65) Prior Publication Data

US 2025/0247424 A1 Jul. 31, 2025

(51) Int. Cl.
*H04L 9/40* (2022.01)

(52) U.S. Cl.
CPC ...... *H04L 63/1483* (2013.01); *H04L 63/1416* (2013.01)

(58) Field of Classification Search
USPC .......................................................... 726/23
See application file for complete search history.

(56) References Cited

U.S. PATENT DOCUMENTS 10,805,346 B2 10/2020 Kumar et al.
11,671,448 B2 6/2023 Nunes et al.
2021/0160281 A1* 5/2021 Hallaji ................ H04L 63/1491
2021/0203692 A1* 7/2021 Nunes .................... G06N 5/046
2021/0234837 A1* 7/2021 Dahan .................. H04L 63/104
2021/0344711 A1 11/2021 Cleveland et al.
2025/0023912 A1* 1/2025 Hu ...................... H04L 63/1483

OTHER PUBLICATIONS

A. K. Jain et al., "Phishing Detection: Analysis of Visual Similarity Based Approaches," Hindawi Security and Communication Networks, vol. 2017, Article ID 5421046, https://doi.org/10.1155/2017/75421046, Jan. 10, 2017, 21 pages.

* cited by examiner

*Primary Examiner* — Sakinah White-Taylor
(74) *Attorney, Agent, or Firm* — Fitch, Even, Tabin & Flannery, LLP

(57) ABSTRACT

This application is directed to systems and methods for detecting phishing attempts in a user application. In some embodiments, a disclosed method includes extracting from an incoming message a uniform resource identifier (URI) for identifying a resource on a computer network, generating a screenshot image of the resource identified by the URI, applying a phishing detection model to process the screenshot image and generate a phishing indicator representing a confidence level of determining that the resource would cause a phishing attack, and in accordance with a determination that the phishing indicator satisfies an alert condition, reporting via an alert message that the URI extracted from the incoming message corresponds to the phishing attack. In some embodiments, the alert condition includes a confidence threshold, and requires that the alert message be generated and reported in accordance with a determination that the phishing indicator is greater than the confidence threshold.

20 Claims, 21 Drawing Sheets

100
122
D1
122
D2
122
D3
122
DN
121
120
120
120
120
102
104
110
112
114
116
COMMUNICATION NETWORK
118
109
108
106

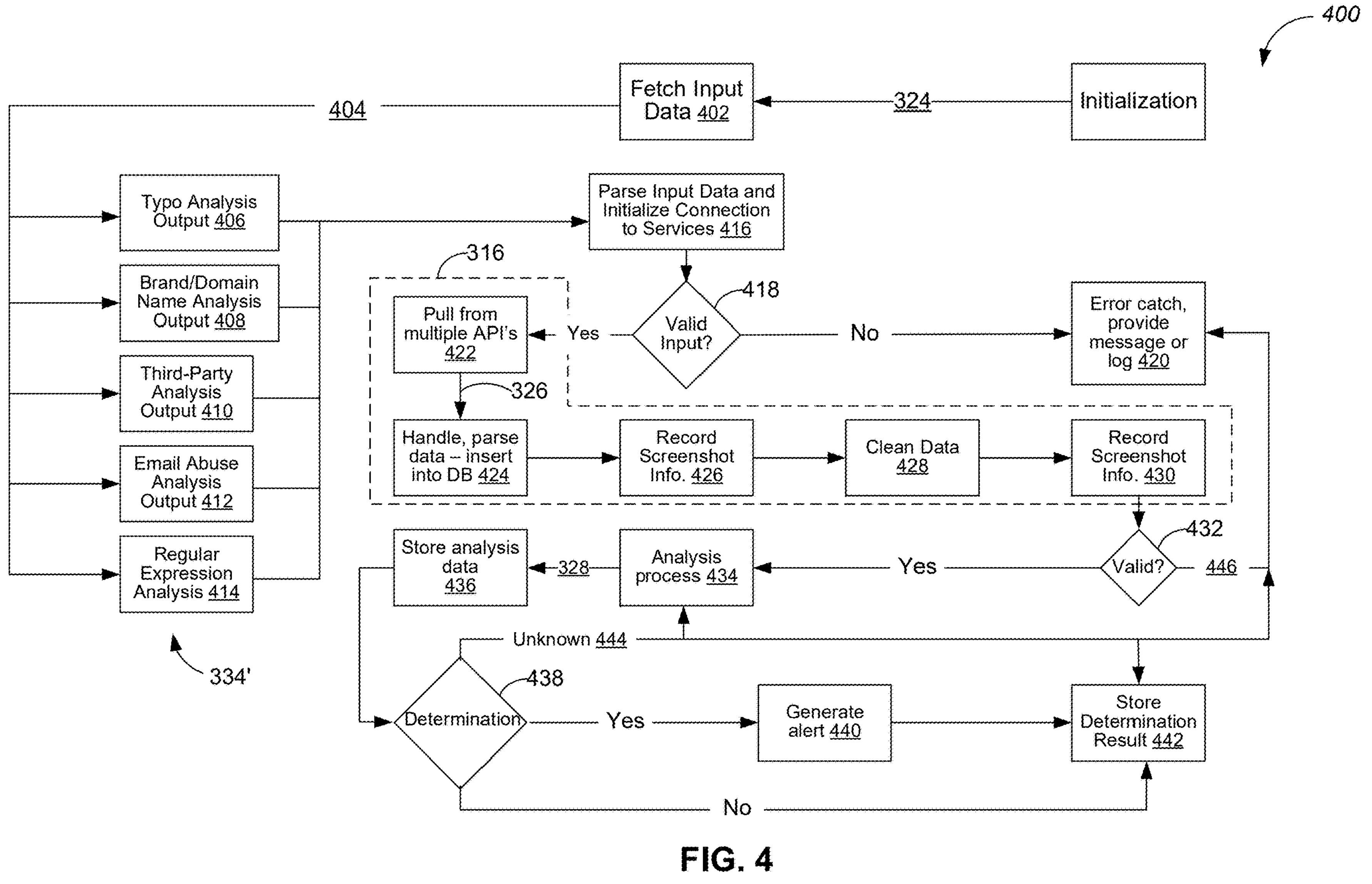
400
Initialization
324
Fetch Input Data 402
404
Typo Analysis Output 406
Brand/Domain Name Analysis Output 408
Third-Party Analysis Output 410
Email Abuse Analysis Output 412
Regular Expression Analysis 414
334'
Parse Input Data and Initialize Connection to Services 416
418
Valid Input?
No
Yes
Error catch, provide message or log 420
316
Pull from multiple API's 422
326
Handle, parse data -- insert into DB 424
Record Screenshot Info. 426
Clean Data 428
Record Screenshot Info. 430
432
Valid?
446
Yes
Analysis process 434
328
Store analysis data 436
Unknown 444
438
Determination
Yes
Generate alert 440
Store Determination Result 442
No
FIG. 4

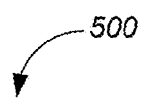

502

502H

| Layer | Output Shape (dimensions) | Channels/Tensors | # of Trainable Parameters |
|---|---|---|---|
| Input Layer 502I | 1600 x 1200 (pixels) | 3 (initially, these are the RGB channels of an image) | 0 |
| Convolutional Layer 1 | 640 x 480 | 10 | 280 |
| Max Pooling Layer 1 | 320 x 240 | 10 | 0 |
| Convolutional Layer 2 | 320 x 240 | 20 | 1,820 |
| Max Pooling Layer 2 | 160 x 120 | 20 | 0 |
| Convolutional Layer 3 | 160 x 120 | 40 | 7,240 |
| Max Pooling Layer 3 | 80 x 60 | 40 | 0 |
| Flattening Layer | 1 | 192,000 (1-dimensional array) | 0 |
| Dense Neural Layer 1 | 1 | 1,024 | 196,609,024 |
| Dropout Layer 1 | 1 | 1,024 | 0 |
| Dense Neural Layer 2 | 1 | 2,048 | 2,099,200 |
| Dropout Layer 2 | 1 | 2,048 | 0 |
| Dense Neural Layer 3 | 1 | 1,024 | 2,098,176 |
| Dropout Layer 3 | 1 | 1,024 | 0 |
| Dense Neural Layer 4 | 1 | 512 | 524,800 |
| Dropout Layer 4 | 1 | 512 | 0 |
| Classification Layer (sigmoid activated, binary cross-entropy) 502O | 1 | 1 | 513 |
| Total Trainable Parameters | 201,341,053 | | |

FIG. 5A

| F1 Score | 0.87 |
| --- | --- |
| Accuracy | 98.4% |
| Precision | 80.58% |
| Recall | 95.39% |

Table 1. Self-evaluation from ITW Week 2, Model v9.1

| True Positives | 1, 759 |
| --- | --- |
| True Negatives | 29, 348 |
| False Positives | 424 |
| False Negatives | 85 |
| Unknowns | 624 |
| Total | 31, 616 |

Table 2. Categorical Totals

FIG. 5B

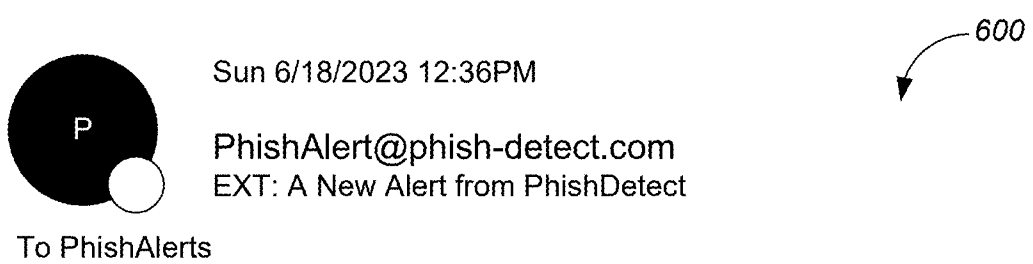
All: 602
The following imagery has been deemed to be threatening to ABC Organization. Please review and determine which are truly phishing.
An Alert has been triggered by the images below!
These 137 images were flagged:
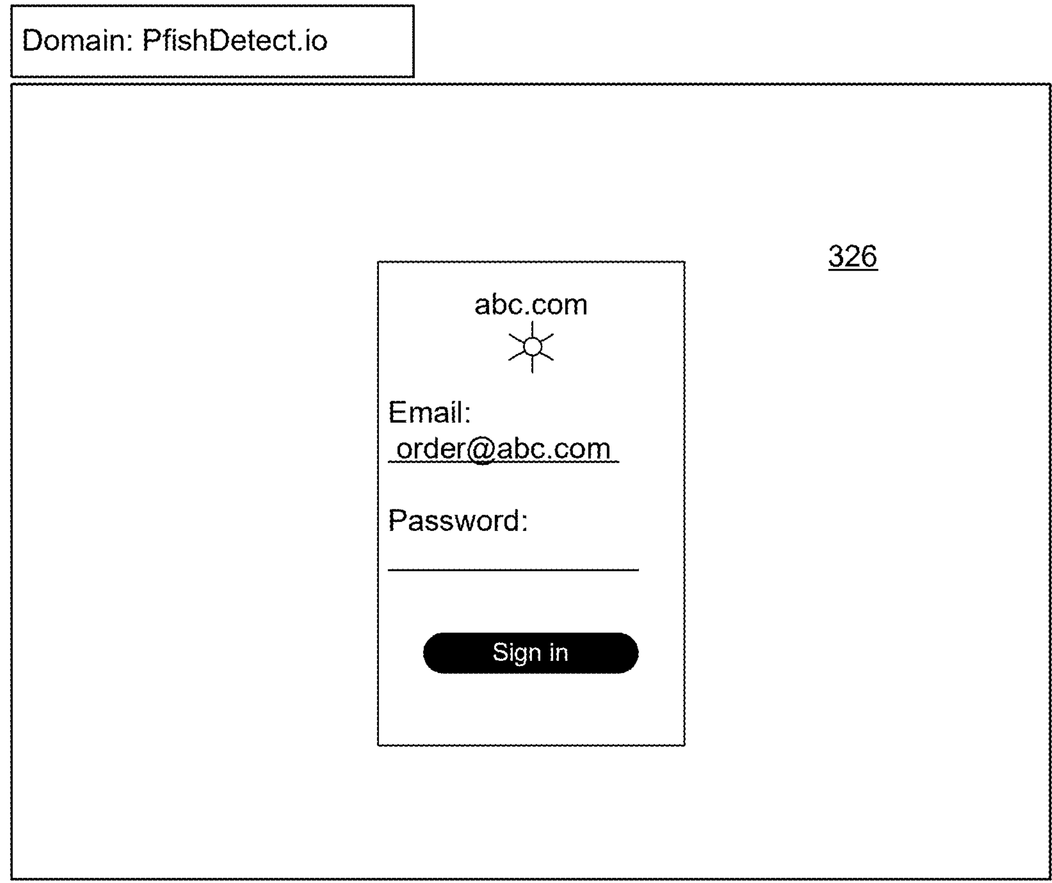
FIG. 6

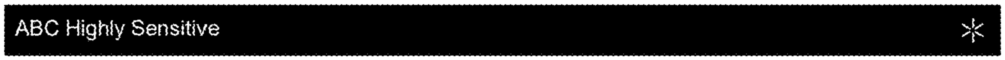
FIG. 7A
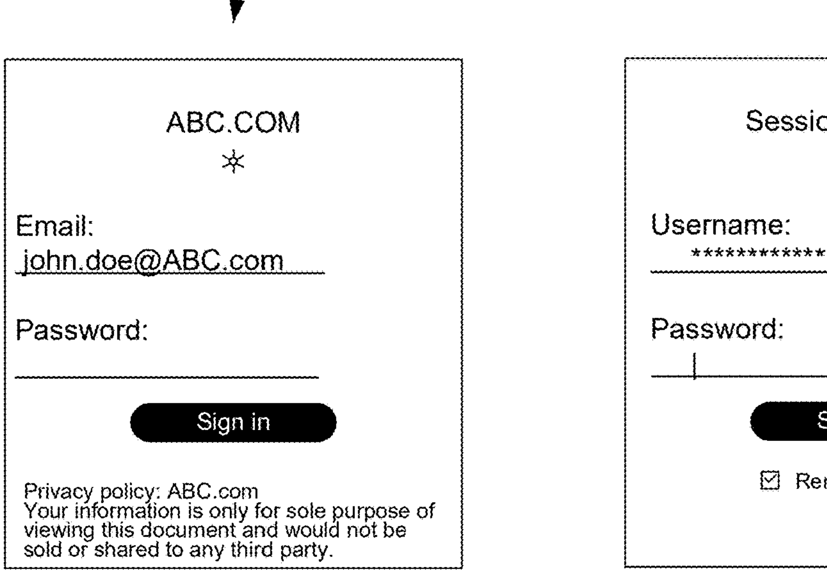
FIG. 7B
FIG. 7C

900

$$x_j^{(n+1)} = f(\sum_i x_i^{(n)} \cdot w_{i,j}^{(n)})$$ Equation (1)

FIG. 16A $$w'^{(n)}_{i,j} = w_{i,j}^{(n)} - \gamma \cdot \delta_j^{(n)} \cdot x_i^{(n)}$$ Equation (2)

FIG. 16B $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$ Equation (3)

FIG. 16C $$\delta_j^{(n)} = \left(x_k^{(n+1)} - t_j^{(n+1)}\right) \cdot f'\left(\sum_i x_i^{(n)} \cdot w_{i,j}^{(n)}\right)$$ Equation (4)

FIG. 16D $$f(x) = f\left[a^{(L+1)}\left(h^{(L)}\left(a^{(L)}\left(\ldots\left(h^{(2)}\left(a^{(2)}\left(h^{(1)}\left(a^{(1)}(x)\right)\right)\right)\right)\right)\right)\right)\right]$$ Equation (5)

FIG. 16E $$a^{(l)}(x) = W^{(l)}x + b^{(l)}$$ Equation (6)

FIG. 16F $$y = \beta + f_1(x_1) + f_2(x_2) + \cdots + f_K(x_K)$$ Equation (7)

FIG. 16G $$y = e^{\beta} e^{f(\log x)} e^{\sum_i f_i^d(d_i)}$$ Equation (8)

FIG. 16H

PHISHING DETECTION OF VISUALLY SIMILAR LOGIN PAGES

TECHNICAL FIELD

This application relates generally to computer security and, more particularly, to systems and methods for detecting phishing attempts within cloud-based service platforms.

BACKGROUND

Phishing attacks often compromise credentials for accessing high-value user accounts of various types of software applications. Although such attempts require the software applications to react promptly and prevent unauthorized usage, detection of phishing attacks often never happens or takes several days to weeks in real life, causing tremendous and irrecoverable damages to users and businesses. Many existing phishing detection systems rely on a heuristic-based approach to discern whether a given webpage resembles a phishing attempt. However, these third-party solutions are hindered by several significant limitations (e.g., susceptibility to evasion through minimal changes in phishing techniques), and fall short in providing a comprehensive and robust solution to safeguard sensitive credentials. It is desirable to have a solution that detects phishing attacks to software applications in a robust, efficient, reliable, accurate, and prompt manner.

SUMMARY

Various embodiments described herein are directed to systems and methods for an integrated phishing detection solution that aligns with immediate needs of a software application's security infrastructure and identifies phishing attempts to the software application promptly, efficiently, and accurately. A system actively harvests input feeds from diverse sources and captures screenshots from multiple tools. A trained phishing detection model is applied to analyze the screenshots and supplemented with an alerting system that implements security analysis and provides security feedback. Specifically, in some embodiments, a system identifies an information page, captures a screenshot image and related metadata about the information page, and applies a trained phishing detection model (e.g., a deep neural network (DNN)) to classify the screenshot image as a legitimate login page provided by an authorized organization or an illegitimate login page provided by an unauthorized organization. In some embodiments, machine learning is supplemented by visual comparison (e.g., similarity hashing) of the information page and the valid login page. In some embodiments, the trained phishing detection model is supplemented by metadata analysis (e.g., for detecting a logo or text). In accordance with a determination that the screenshot image is classified to an invalid login page, the system creates an alert reminding a security team associated with the software application of a follow-up with the invalid login page.

Some implementations of this application are generally directed to applying visual comparison to determine whether an information page is similar to a legitimate login page of a software application associated with an organization. In accordance with a determination that the information page is not similar to the legitimate login page, the system determines that the information page is not hosted by the software application and associated with a phishing attempt. In some embodiments, upon detection of an invalid login page, the system sends out an alert for security operation review of the invalid login page. By these means, this application provides a straightforward and integrated solution that easily detects a phishing login page resembling the legitimate login page with high fidelity. This integrated solution is tailored to visually identify fakes of a small number of legitimate pages and targeted at degrading specific obfuscation techniques and attempts at mimicry efficiently.

In various embodiments, a system including a non-transitory memory configured to store instructions thereon and at least one processor is disclosed. The at least one processor is configured to read the instructions to extract from an incoming message, a uniform resource identifier (URI) for identifying a resource on a computer network; generate a screenshot image of the resource identified by the URI; apply a trained phishing detection model to process the screenshot image and generate a phishing indicator representing a confidence level of determining that the resource would cause a phishing attack; and in accordance with a determination that the phishing indicator satisfies an alert condition, generate an alert message indicating that the URI extracted from the incoming message corresponds to the phishing attack.

In various embodiments, a computer-implemented method is disclosed. The computer-implemented method includes: extracting, from an incoming message, a URI for identifying a resource on a computer network; generating a screenshot image of the resource identified by the URI; applying a trained phishing detection model to process the screenshot image and generate a phishing indicator representing a confidence level of determining that the resource would cause a phishing attack; and in accordance with a determination that the phishing indicator satisfies an alert condition, generating an alert message indicating that the URI extracted from the incoming message corresponds to the phishing attack.

In various embodiments, a non-transitory computer readable medium having instructions stored thereon is disclosed. The instructions, when executed by at least one processor, cause at least one device to perform operations including: extracting, from an incoming message, a URI for identifying a resource on a computer network; generating a screenshot image of the resource identified by the URI; applying a trained phishing detection model to process the screenshot image and generate a phishing indicator representing a confidence level of determining that the resource would cause a phishing attack; and in accordance with a determination that the phishing indicator satisfies an alert condition, generating an alert message indicating that the URI extracted from the incoming message corresponds to the phishing attack.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 4 is a flow diagram of an example process of detecting phishing login pages of a user application, in accordance with some embodiments;

FIG. 5A is a table listing characteristics of an example set of neural network layers of a neural network applied to detect phishing login pages of a user application, in accordance with some embodiments;

FIG. 5B illustrates two tables associated with self-evaluation results and categorical total results, in accordance with some embodiments;

FIG. 6 is an example email message including an alert message regarding detection of phishing login pages, in accordance with some embodiments;

FIG. 7A is an example screenshot image of an authentic login webpage of an authorized organization, in accordance with some embodiments, and FIGS. 7B and 7C are two example regions of interest (ROIs) on an authentic login webpage of an authorized organization, in accordance with some embodiments;

FIG. 16A-16H are diagrams showing equations applied to process information, in accordance with some embodiments.

DETAILED DESCRIPTION

Figure 1:
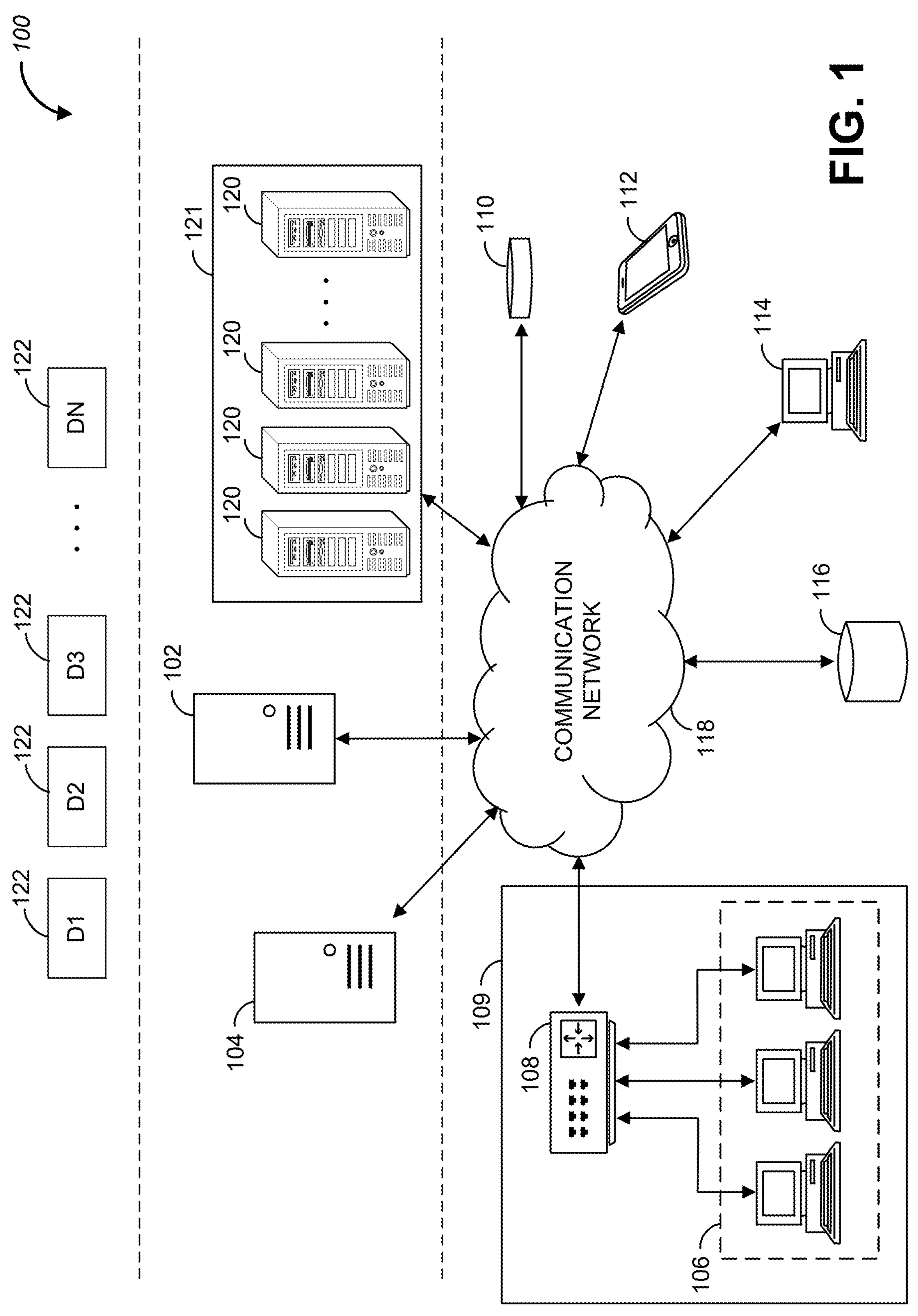
FIG. 1 is a network environment configured to provide a user application to a plurality of tenants, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

Various embodiments described herein are directed to systems and methods for an integrated phishing detection solution that aligns with immediate needs of a software application's security infrastructure and identifies phishing attempts to the software application promptly, efficiently, and accurately. A system actively harvests input feeds from diverse sources and captures screenshots from multiple tools. A trained phishing detection model is applied to analyze the screenshots and supplemented with an alerting system that implements security analysis and provides security feedback. Specifically, in some embodiments, a system identifies an information page, captures a screenshot image and related metadata about the information page, and applies a trained phishing detection model (e.g., a DNN model) to classify the screenshot image as a valid login page or an invalid login page. In some embodiments, the trained phishing detection model is supplemented by visual comparison (e.g., similarity hashing) of the information page and the valid login page. In some embodiments, the trained phishing detection model is supplemented by metadata analysis (e.g., for detecting a logo or text). In accordance with a determination that the screenshot image is classified to an invalid login page, the system creates an alert reminding a security team associated with the software application of a follow-up with the invalid login page.

Some embodiments of this application are directed to systems and methods for detecting phishing attempts targeted at credentials of user accounts of a user application (e.g., credentials used by associates or customers to log onto user accounts of an application). For example, a type of phishing attempt aims to gather credentials used to authenticate user accounts for infrastructure logins, and can be propagated to cause major incidents to the infrastructure. Visual comparison consistently detects this type of phishing attempts with the help of phishing detection. In some embodiments, the systems and methods rely on content served by potentially malicious external web servers, particularly including screenshot images of websites enabled by the potentially malicious external web servers. In some situations, these websites are picked up by a user's own feeds. While some solutions analyze a lure of a phishing attempt, e.g., an email message that is sent to a legitimate user account and contains a uniform resource locator (URL), or an ingress point via which the phishing attempt reaches an associate or customer associated the user account, the disclosed systems and methods utilize data obtained at subsequent steps within the phishing attempt to recognize malicious interfaces.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for automatic phishing detection utilizing one or more trained machine learning models. In some embodiments, a URI for identifying a resource on a computer network is extracted from an incoming message, a screenshot image of the resource identified by the URI is generated, a trained phishing detection model is applied to process the screenshot image and generate a phishing indicator representing a confidence level of determining that the resource would cause a phishing attack, and in accordance with the phishing indicator satisfies an alert condition, an alert message is generated indicating that the URI extracted from the incoming message corresponds to the phishing attack.

FIG. 1 is a network environment configured to provide a user application (e.g., a network interface application) to a plurality of divisions, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a phishing detection computing device 102 (e.g., a server, such as an application server), a web server 104, a cloud-based engine 121 including one or more processing devices 120, workstation(s) 106, a database 116, and one or more user computing devices 110, 112, 114 operatively coupled over the network 118. The phishing detection computing device 102, the web server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the phishing detection computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the item recommendation computing device 102.

In some examples, each of the user computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more network environments, or portions thereof, such as an e-commerce environment. In some examples, the phishing detection computing device 102, the processing devices 120, and/or the web server 104 are operated by a network environment provider, and the multiple user computing devices 110, 112, 114 are operated by users of the network environment. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a physical location 109, for example. The workstation(s) 106 can communicate with the phishing detection computing device 102 over the communication network 118. The workstation(s) 106 may send data to, and receive data from, the phishing detection computing device 102.

Although FIG. 1 illustrates three user computing devices 110, 112, 114, the network environment 100 can include any number of user computing devices 110, 112, 114. Similarly, the network environment 100 can include any number of the phishing detection computing devices 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the user computing devices 110, 112, 114 may communicate with the web server 104 over the communication network 118. For example, each of the user computing devices 110, 112, 114 may be operable to view, access, and interact with a website, such as an e-commerce website, hosted by the web server 104. The web server 104 may transmit user session data related to a user's activity (e.g., interactions) on the website. For example, a user may operate one of the user computing devices 110, 112, 114 to initiate a web browser that is directed to the website hosted by the web server 104. The user may, via the web browser, login to or otherwise interact with a software application or web application interface, for example. The website may capture these activities as user session data, and transmit the user session data to the phishing detection computing device 102 over the communication network 118.

In some examples, the phishing detection computing device 102 may execute one or more models, such as a trained phishing detection model, deep learning model, statistical model, etc., to identify phishing attempts that attempt to mimic the provided website and/or software applications. The phishing detection computing device 102 may transmit a phishing determination and/or alert to the web server 104 over the communication network 118, and the web server 104 may display the alert on the website and/or prevent execution of the selection operation or link.

The phishing detection computing device 102 is further operable to communicate with the database 116 over the communication network 118. For example, the phishing detection computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the phishing detection computing device 102, in some examples, the database 116 can be a local storage device, such as a hard drive, a non-volatile memory, or a USB stick. The phishing detection computing device 102 may also receive from the web server 104 user session data identifying events associated with browsing sessions, and may store the user session data in the database 116.

In some examples, the phishing detection computing device 102 generates training data for a plurality of models (e.g., machine learning models, deep learning models, statistical models, algorithms, etc.) based on image data, historical user session data, etc. The phishing detection computing device 102 trains the models based on their corresponding training data, and the phishing detection computing device 102 stores the models in a database, such as in the database 116 (e.g., a cloud storage).

The models, when executed by the phishing detection computing device 102, allow the phishing detection computing device 102 to determine item recommendations to be displayed to a customer. For example, the phishing detection computing device 102 may obtain the models from the database 116. The phishing detection computing device 102 may then receive, in real-time from the web server 104, a reference image corresponding to a resource provided by a URI. In response to receiving the reference image, the phishing detection computing device 102 may execute the models to determine whether the URI represents a phishing attempt.

In some examples, the phishing detection computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, item recommendation computing device 102 may generate ranked item recommendations for items to be displayed on the website to a user.

In some embodiments, the network environment 100 is configured to provide a user application (e.g., a network interface application) to a plurality of users 122 (e.g., customers, associates). An example of the plurality of users 122 is a plurality of customers that subscribes to service provided by the computing devices 102, 104, and 120, and therefore share resources via the network environment 100. The user application is deployed for the plurality of users 122, and executed to process requests associated with the plurality of users 122 in the network environment 100 after the plurality of users 122 are authenticated and authorized to access the user application. For example, login pages are displayed on the workstation(s) 106 and the multiple customer computing devices 110, 112 and 114, allowing the plurality of users 122 to provide their credentials (e.g., user names, passwords). Upon authentication, requests associated with the plurality of users 122 (e.g., search requests, purchase requests, account review requests) are received from the workstation(s) 106 and customer computing devices 110, 112 and 114.

The network environment 100 is implemented to enable secure concurrent access experience by multiple users 122 of the user application, security of the user accounts (e.g., account authentication) of the plurality of users 122 is managed in a centralized manner by the cloud-based engine 121. In some embodiments, the phishing detection computing device 102 and/or the cloud-based engine 121 obtains authentication messages associated with the plurality of users 122 of the user application, generates screenshot images of resources identified in the authentication messages, and determines whether the screenshot images are associated with phishing attempts. During this process, one or more trained phishing detection models (e.g., a DNN model) that has been trained to differentiate invalid login pages from a plurality of known login pages of the user application is applied. The phishing detection computing device 102 and/or the cloud-based engine 121 tracks results regarding the phishing attempts and takes additional measures (e.g., reporting, analysis) to deter the phishing attempts.

Figure 2:
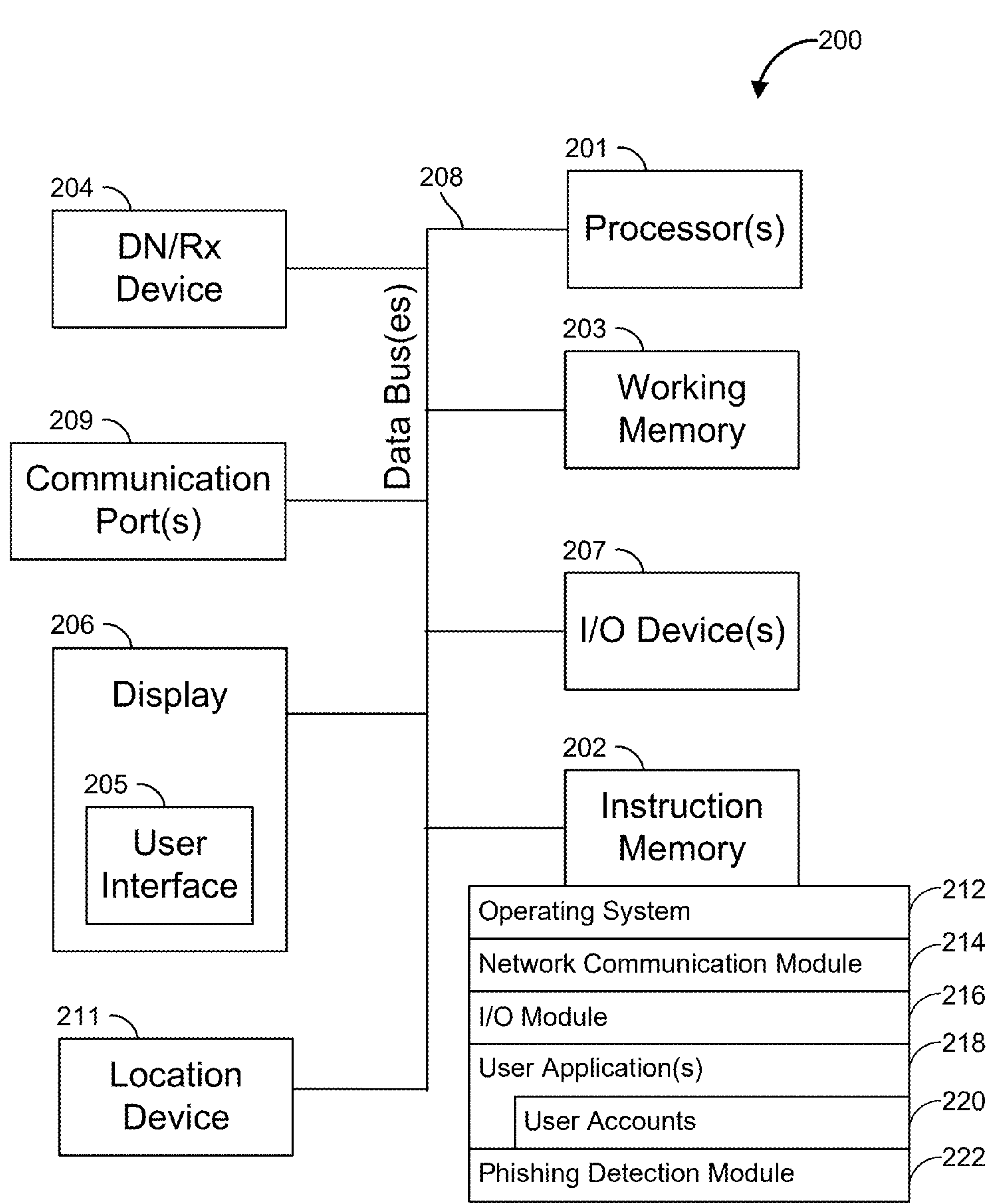
FIG. 2 is a block diagram of a computing device, in accordance with some embodiments.

FIG. 2 is a block diagram of a computing device 200, in accordance with some embodiments of the present teaching. In some embodiments, each of the phishing detection computing device 102, the web server 104, the workstation(s) 106, the user computing devices 110, 112, 114, and/or the one or more processing devices 120 in FIG. 1 may include the features shown in FIG. 2. Referring to FIG. 2, the computing device 200 includes one or more of: one or more processors 201, a working memory 202, one or more input/output devices 207, an instruction memory 203, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 202 can store instructions that can be accessed (e.g., read) and executed by the processors 201. For example, the instruction memory 202 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 202, embodying the function or operation. For example, the processors 201 can be configured to execute code stored in the instruction memory 202 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 202. The processors 201 can also use the working memory 202 to store dynamic data created during the operation of the item recommendation computing device 102. The working memory 202 can be a random access memory (RAM) such as a static random access memory (SRAM) or dynamic random access memory (DRAM), or any other suitable memory.

The input-output devices 207 can include any suitable device that allows for data input or output. For example, the input-output devices 207 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allow(s) for the programming of executable instructions in the instruction memory 202. In some examples, the communication port(s) 209 allow(s) for the transfer (e.g., uploading or downloading) of data, such as phishing detection model training data.

The display 206 can be any suitable display, and may display the user interface 205. The user interfaces 205 can enable user interaction with the item recommendation computing device 102. For example, the user interface 205 can be a user interface for an application of a retailer that allows a customer to view and interact with a retailer's website. In some examples, a user can interact with the user interface 205 by engaging the input-output devices 207. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the item recommendation computing device 102 will be operating in. The processor(s) 201 is operable to receive data from, or send data to, a network, such as the communication network 118 of FIG. 1, via the transceiver 204.

The optional location device 211 may be communicatively coupled to one or more location services and/or devices and operable to receive position data from the corresponding location services. For example, the location device 211 may receive position data identifying a latitude, and longitude, from a satellite of a positioning constellation. Based on the position data, the phishing detection computing device 102 may determine a local geographical area (e.g., town, city, state, etc.) of its position.

In some embodiments, the computing device 200 is configured to implement a user application for a plurality of users 122 via service deployment, service execution, self-learning and fine tuning, and session knowledge enrichment. In some embodiments, the working memory 203, or alternatively the non-transitory computer readable storage medium of memory 202, stores the following programs, modules and data structures, instructions, or a subset thereof:

- Operating system 212 that includes procedures for handling various basic system services and for performing hardware dependent tasks;
- Communication module 214 that is used for connecting the computing device 200 to other machines (e.g., other devices 102, 104, 120, 106, 110, 112, 114, and/or 116 in the network environment 100) via one or more network communication ports 209 (wired or wireless) and one or more communication networks 118, such as the Internet, other wide area networks, local area networks, metropolitan area networks, and so on;
- I/O module 216 that includes procedures for handling various basic input and output functions through one or more input and output devices;
- User application 218 that is executed to provide server-side functionalities, where an example of the user application 218 is a login application having a plurality of user accounts 220 associated with a plurality of users 122; and
- Phishing detection module 222 that is executed to monitor incoming messages of the plurality of user accounts 220 of the plurality of users 122 and detect phishing attacks associated with credential authentication of the user application 218.

More details on operations of the phishing detection module 222 are explained below with reference to FIGS. 3A-10.

Figure 3A:
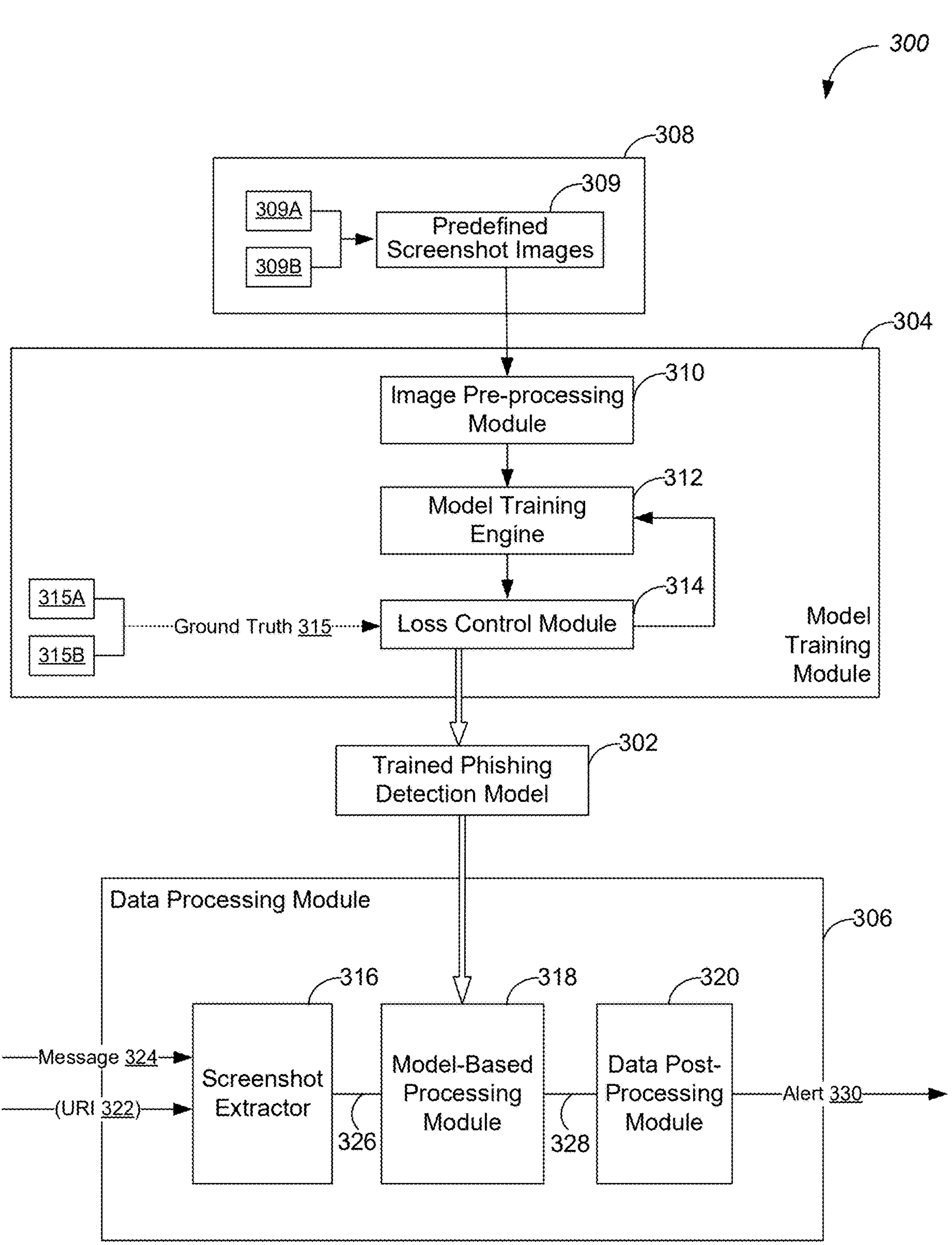
FIGS. 3A and 3B are two block diagrams of two example systems for training and applying a phishing detection model for detecting phishing attempts, in accordance with some embodiments.
Figure 3B:
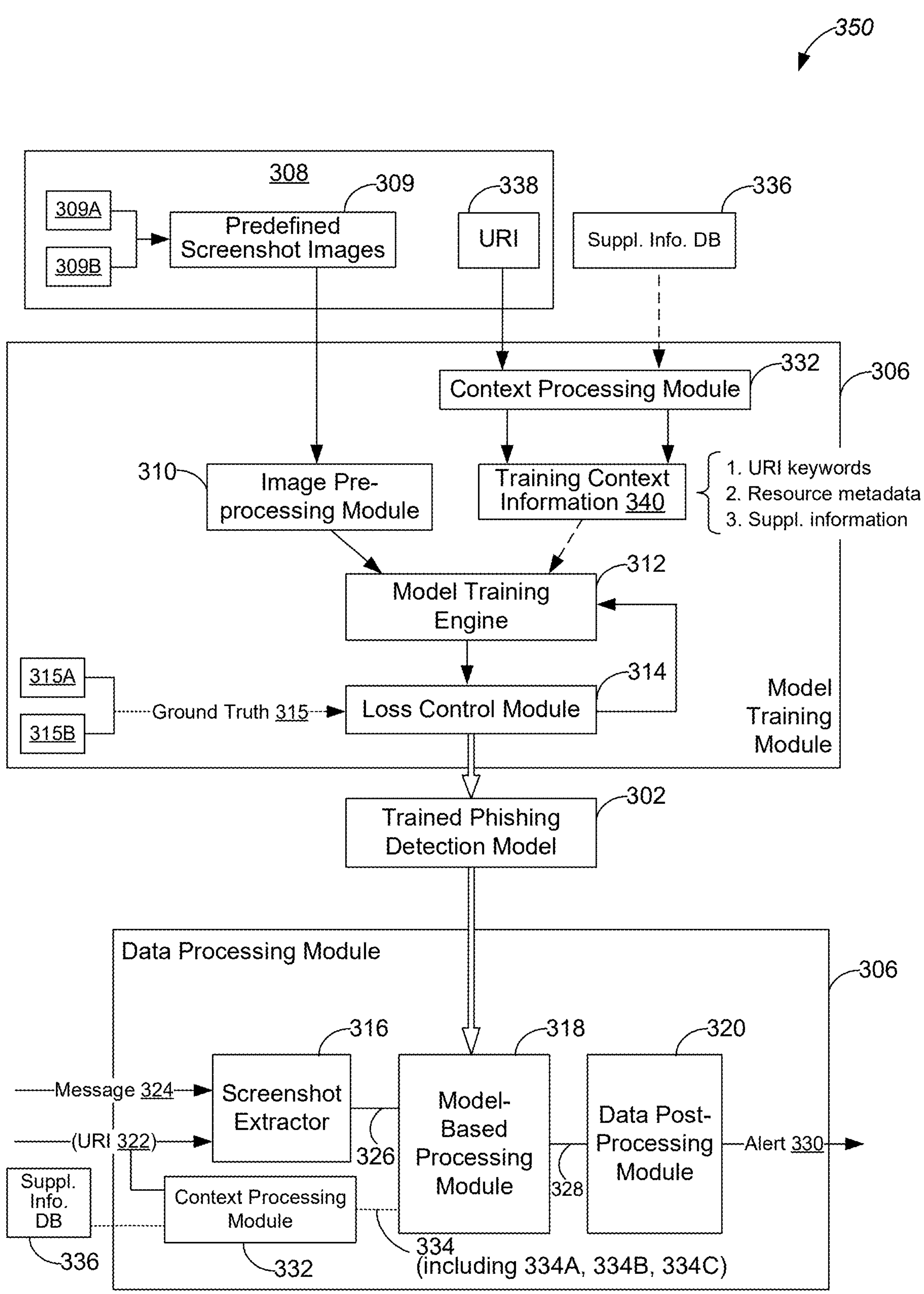

FIGS. 3A and 3B are two block diagrams of two example systems 300, 350 for training and applying a trained phishing detection model 302 for detecting phishing attempts, in accordance with some embodiments. The system 300, 350 includes a phishing detection module 222 for monitoring incoming messages of a plurality of user accounts 220 and detecting phishing attacks associated with credential authentication of a user application 218, e.g., using a trained phishing detection model. The phishing detection module 222 further includes a model training module 304 for establishing the trained phishing detection model 302 and a data processing module 306 for processing the incoming messages using the trained phishing detection model 302. In some embodiments, the model training module 304 and the data processing module 306 are both implemented on one or more processing devices 120 of a cloud-based server 121 (FIG. 1). A training data source providing training data 308 is optionally the cloud-based server 121 itself, another server, or the database 116. The training data 308 include a plurality of predefined screenshot images 309.

The model training module 304 includes a data pre-processing module 310, a model training engine 312, and a loss control module 314. The pre-processing module 310 pre-processes the predefined screenshot images 309, e.g., by cropping each predefined screenshot image 309 based on a region of interest (ROI) including one or more predefined target fields or adjusting each predefined screenshot image 309 based on a predefined image resolution. The model training engine 312 receives pre-processed training data 308 provided by the data pre-processing modules 310, further processes the pre-processed training data 308 using a phishing detection model 302, and generates an output from each data element in the pre-processed training data 308 (e.g., each predefined screenshot image 309). During this course, the loss control module 314 can monitor a loss function comparing the output associated with the respective data element of the pre-processed training data 308 and a ground truth 315 of the respective data element of the pre-processed training data 308. The model training engine 312 modifies the phishing detection model 302 to reduce the loss function, until the loss function satisfies a loss criterion (e.g., a comparison result of the loss function is minimized or reduced below a loss threshold). The modified phishing detection model 302 is provided to the data processing module 306 to process the content data.

In some embodiments, the model training module 304 offers supervised learning in which the training data are entirely labelled and include a desired output for each data element of the pre-processed training data 308 (also called the ground truth 315 in some situations). Conversely, in some embodiments, the model training module 304 offers unsupervised learning in which the training data 308 are not labelled. The model training module 304 is configured to identify previously undetected patterns in the training data 308 without pre-existing labels and with no or little human supervision. Additionally, in some embodiments, the model training module 304 offers partially supervised learning in which the training data 308 are partially labelled.

The data processing module 306 includes a screenshot extractor module 316, a model-based processing module 318, and a data post-processing module 320. The screenshot extractor module 316 extracts a URI 322 from an incoming message 324, and the URI 322 identifies a resource (e.g., login pages of a user application 218) on a computer network. The URI 322 identifies the resource on the computer network based on an application layer protocol, such as, for example, Hypertext Transfer Protocol (HTTP), Hypertext Transfer Protocol Secure (HTTPS), File Transfer Protocol (FTP), and a Secure Shell Protocol (SSH). The screenshot extractor module 316 generates at least a screenshot image 326 of the resource identified by the URI 322. In some embodiments, the screenshot extractor module 316 includes a data pre-processing module whose functions are consistent with those of the pre-processing modules 310 and convert the screenshot image 326 to a predefined format that is acceptable by inputs of the model-based processing module 318. In some embodiments, the screenshot image 326 is pre-processed to extract an ROI, cropped to a predefined image size, and/or scaled to a predefined resolution. Further, in some embodiments, the screenshot extractor module 316 further obtains metadata and supplemental information of the resource identified by the URI 322. The model-based processing module 318 applies the trained phishing detection model 302 provided by the model training module 304 to process the screenshot image 326 optionally with the metadata and supplemental information of the resource identified by the URI 322. Specifically, the model-based processing module 318 generates a phishing indicator 328 representing a confidence level of determining that the resource identified by the URI 322 would cause a phishing attack.

The phishing indicator 328 is further processed by the data post-processing module 320 to present the phishing indicator 328 in a preferred format and/or to provide other related information that can be derived from the phishing indicator. For example, in accordance with the phishing indicator 328 satisfying an alert condition, the data post-processing module 320 generates an alert message 330 indicating that the URI extracted from the incoming message corresponds to a phishing attack. In some embodiments, the data post-processing module 320 selects one of a plurality of template messages and drafts the alert message 330 based on the selected template message and/or unique information of the incoming message 324. Alternatively, in some embodiments, the data post-processing module 320 applies a large language model (LLM) (e.g., Generative Pre-trained Transformer (GPT)) to generate the alert message 330 based on relevant information (e.g., incoming message 324, phishing indicator 328). The LLM is optionally managed by the system or a third-party server.

Referring to FIG. 3A, in some embodiments, the trained phishing detection model 302 is trained using a plurality of training images 308 and a plurality of ground truth indicators 315. Each training image 308 includes a predefined screenshot image 309 and is uniquely associated with a respective ground truth indicator 315 indicating whether the respective image would cause a phishing attack. The phishing detection model 302 is trained using the plurality of training images 308. In some embodiments, the plurality of training images 308 further include a set of one or more reference screenshot images 309A each of which is associated with a respective ground truth indicator 315A equal to a first value (e.g., "0"). The first value indicates that each of the set of one or more reference screenshot images 309A includes a screenshot image of a respective web page of one or more authorized organizations (e.g., authentic login pages). In some embodiments, the plurality of training images 308 further include a set of phishing screenshot images 309B each of which associated with a respective ground truth indicator 315B equal to a second value (e.g., equal to "1"), which indicates that each of the set of phishing screenshot images 309B includes a screenshot image of a respective web page that is not provided by any authorized organization.

Referring to FIG. 3B, in some embodiments, the data processing module 306 further includes a context processing module 332 in addition to the modules 316-320, and the context processing module 332 is configured to generate context information 334. For example, the URI 322 of the resource in the incoming message 324 is parsed to extract one or more keywords 334A in the URI, and the phishing detection model 302 is applied by the model-based processing module 318 to process the screenshot image 326 and the one or more keywords 334A jointly and generate the phishing indicator 328. Alternatively, in some embodiments, the context processing module 332 extracts one or more contextual information items 334 from a supplemental information database 336 based on the URI 322 of the resource. The trained phishing detection model 302 is applied by the model-based processing module 318 to process the screenshot image 326 and contextual information 334 jointly and generate the phishing indicator 328. Further, in some embodiments, the URI 322 is parsed to extract one or more keywords 334A in the URI 322, and the one or more supplemental information items 334B are extracted from the supplemental information database 336 based on the one or more keywords 334A. The supplemental information database 336 is optionally a public database. For example, a supplemental information item 334B is provided as a result of an Internet search. The supplemental information database 336 is optionally a vendor database. Alternatively and additionally, in some embodiments, the context processing module 332 extracts metadata 334C of the resource based on the URI 322 of the resource, and the phishing detection model 302 is applied to process the screenshot image 326 and the metadata 334C of the resource jointly. The URI 322 includes a URL that further includes one or more of: a domain name, a part, a path to a file, a parameter, and an anchor. Any information contained in the URI can be used as the metadata 334C. For example, in embodiments including a URI 322 in the form of https://host/ip/description/ID, the metadata 334C of this URI 322 may include the "description" and "ID."

In some embodiments, the model training module 304 includes a context processing module 332 configured to generate training context information 340. The context processing module 332 obtains a training URI 338 that optionally refers to a resource (e.g., a web page) correctly or erroneously. The training URI 338 is analyzed to generate the training context information 340 that is processed by the model training engine 312 jointly with the screenshot images 309 of the training data 308. The training context information 340 includes a URI keyword 334A, URI metadata 334C, a supplemental information item 334B extracted from the supplemental information database 336, or a combination thereof.

FIG. 4 is a flow diagram of an example process 400 of detecting phishing login pages of a user application 218, in accordance with some embodiments. The process 400 is based on visual comparison. A system determines whether a resource identified by a URI (e.g., a web page) is visually similar to one or more legitimate login pages (also called reference screenshot images 309A). In accordance with a determination that the resource identified by the URI is visually similar to any legitimate login page, the system determines that the resource identified by the URI is not hosted by one or more authorized organizations and associated with a phishing attack. In some embodiments, the resource includes a web page and the URI includes a uniform resource locator (URL) of the web page. The system obtains an incoming message including the URL, and sends an access request including the URL identifying the web page. The system captures a screenshot image 326 of the web page loaded at a browser in response to the access request, extracts related context information 334 (e.g., URL metadata), and conducts an image similarity check through a trained phishing detection model 302, such as a trained DNN-based model, with a confidence level. The trained phishing detection model 302 determines whether the screenshot image 326 corresponds to a legitimate login page or not. Based on an output of the trained phishing detection model 302, the system generates an alert 330 indicating the URL represents a phishing attack. Additional actions and/or operations may be executed in response to the alert 330.

After the system is initiated, the system obtains input data 404, including an incoming message 324 and a URI, and extracts the URI. In some embodiments, context information 334 is used and includes one or more of: one or more keywords 334A of the URI, one or more supplemental information items 334B obtained from a supplemental information database, and/or metadata 334C of the resource. In some embodiments, additional input data sources are used by the system to provide additional context information 334. Examples of such additional context information 334 include, but are not limited to, one or more of: typo analysis output 406 of legitimate web pages, brand and domain name analysis output 408, third-party analysis output 410, email abuse analysis output 412, and regular expression analysis output 414. Context information 334 is optionally provided by a third-party analysis application. As such, in some embodiments, the input data 404 includes the context information 334 (FIGS. 3A and 3B), the additional context information 334', or both in addition to the incoming message 324 that further includes the URI.

The input data 404 are parsed (416) to initialize a connection to phishing detection services performed by the phishing detection module 222 (see FIG. 2). In some embodiments, the system determines (418) whether the input data 404 are valid or invalid. In accordance with a determination that the input data 404 (e.g., the incoming message 324, context information 334, 334') are invalid, the system identifies (420) an error (e.g., an alert condition), generates an alert message 330 (FIGS. 3A and 3B) that the URI extracted from the incoming message 324 corresponds to a phishing attack, and/or logs the error into a database 116 (see FIG. 1). Conversely, in accordance with a determination that the input data 404 (e.g., the incoming message 324, context information 334 or 334') are valid, the system extracts a screenshot image 326 using a screenshot extractor 326 (FIGS. 3A and 3B). Specifically, the system extracts (422) a screenshot image 326 of the resource identified by the URI, e.g., using one or more application programming interfaces (API). The screenshot image 326 is handled, parsed, and inserted into the database 116 (424), and information of the screenshot image 326 is recorded (426). For example, the screenshot image 326 is cropped based on an ROI including one or more predefined target fields or adjusted (e.g., cropped and/or scaled) based on a predefined image resolution. The screenshot image 326 is further cleaned (428), and the information of the screenshot image 326 is recorded 430.

The system further validates (432) the screenshot image 326, context information 334, and/or context information 334'. In accordance with a determination that the screenshot image 326, context information 334, and/or context information 334' are valid, the system applies a phishing detection model 302 to analyze (434) the screenshot image 326, with or without a subset of context information 334 and 334', and generates a phishing indicator 328 (FIGS. 3A and 3B) representing a confidence level that the resource would cause a phishing attack. The system stores (436) analysis data including the phishing indicator 328 and determines (438) whether the phishing indicator 328 satisfies an alert condition. In accordance with a determination that the phishing indicator 328 satisfies the alert condition, the system generates (440) an alert message 330 indicating that the URI extracted from the incoming message 324 corresponds to a phishing attack. The phishing indicator 328 and/or the alert message 330 are stored (442) in association with the incoming message 324 including the URI. Conversely, in accordance with a determination that the phishing indicator 328 satisfies a non-alert condition, it is determined that the URI extracted from the incoming message 324 does not correspond to any phishing attack, and no alert message is generated. The phishing indicator 328 is also stored (442) in association with the incoming message 324 including the URI.

In some embodiments, the alert condition includes a confidence threshold. The alert message 330 is generated (440) in accordance with a determination that the phishing indicator 328 is greater than the confidence threshold. In one example, the phishing indicator 328 is equal to "0" for the confidence level of determining that a legitimate login page would cause a phishing attack, and "1" for the confidence level of determining that a known phishing login page would cause a phishing attack. The phishing indicator 328 may be equal to a real number between 0 and 1. If the confidence threshold is 0.6 and the phishing indicator 328 is greater than 0.6, the system generates the alert message 330 and reports that the URI extracted from the incoming message 324 corresponds to a phishing attack. In some embodiments, the non-alert condition is associated with a different confidence threshold (e.g., 0.4). If the phishing indicator 328 is lower than 0.4, the system does not generate the alert message 330 or report that the URI extracted from the incoming message 324 corresponds to the phishing attack. Further, in some situations, the phishing indicator 328 is between the two confidence thresholds (e.g., 0.4 and 0.6), and the system identifies an unknown condition 444, which, in some embodiments, requires repeating application of a phishing detection model 302 to re-analyze (434) the screenshot image 326, with or without the subset of context information 334 and 334', and re-generate the phishing indicator 328. In some embodiments, in accordance with an identification of an invalid screenshot image 446 or the unknown condition 444, the system logs (420) information of the invalid screenshot image 446 and the unknown condition 444 into the database 116.

Further, in some embodiments, the system determines a portion of a resource pool subject to reporting and/or adjusts a confidence threshold based on the resource portion. For example, an organization owns and/or operates 10,000 web pages, where only 1,000 web pages are considered "high priority" web pages. The trained phishing detection model is configured such that only phishing attacks associated with at least one of the 1,000 high priority web pages results in a phishing indicator 328 greater than the confidence threshold and/or only phishing attacks associated with at least one of the 1,000 high priority web pages need to be reported via alert messages 330. In some embodiments, phishing attacks associated with the remaining resources, e.g., the 9,000 other web pages of the organization, do not need to be reported. As the number of the high priority web page increases, the confidence level increases (i.e., the higher the portion of the resource pool, the higher the confidence threshold).

In some embodiments, the process 400 is divided into a plurality of stages to allow for modularization associated with a custom DNN architecture, a determination logic, and an end-to-end workflow. In accordance with the plurality of stages of the process 400, URIs of incoming messages 324 are sourced and queued for evaluation and investigation. For example, the URLs are evaluated with questions regarding one or more of: validity of the URLs, validity of Domain Name System (DNS) records, resolving of URLs, and validity of schemas. If all of these checks pass, the URLs are scanned via one or more third-party solutions to obtain screenshot images 326. The trained phishing detection model 302 is applied to process the screenshot images 326 and generate the phishing indicator 328 representing a confidence level of determining that the resource would cause a phishing attack. If the phishing indicator 328 reaches a confidence threshold, an alert message 330 is generated indicating the URI extracted from the incoming message corresponds to a phishing attack. The phishing indicator 328, the alert message 330, intermediate results, and/or the incoming messages may be stored in a logging format for further analysis. In some embodiments, only results and incoming messages associated with phishing attacks are stored. Alternatively, in some embodiments, results and incoming messages are stored, independently of whether they are associated with phishing attacks. It is noted that, additionally and/or alternatively, in some embodiments, computer vision that does not involve machine learning may be used for visual comparison (e.g., similarity image hashing) and/or metadata (e.g., logo detection, text detection) may be used to facilitate computer vision.

FIG. 5A is a table 500 listing characteristics of an example set of neural network layers 502 of a trained neural network applied to detect phishing login pages of a user application 218, in accordance with some embodiments. FIG. 5B illustrates two tables associated with self-evaluation results and categorical total results, in accordance with some embodiments. A phishing detection model 302 (FIGS. 3A and 3B) is applied to process a screenshot image 326 of a resource (e.g. a login page) identified by a URI and generate a phishing indicator 328 representing a confidence level of determining that the resource would cause a phishing attack. In some embodiments, the phishing detection model 302 is established based on the neural network in which the set of neural network layers 502 includes one or more hidden layers 502H between an input layer 502I and output layer 5020. A corresponding model-based processing module 318 applies the phishing detection model 302 including the neural network layers 502 to process at least the screenshot image 326.

Each neural network layer 502 includes a collection of nodes that are connected by links to one or more other neural network layers. Each node receives one or more node inputs and applies a propagation function to generate a node output from the node input(s). As the node output is provided via one or more links to one or more other nodes, a weight w associated with each link is applied to the node output. Likewise, the node input(s) can be combined based on corresponding weights w according to the propagation function. For example, the propagation function is a product of a non-linear activation function and a linear weighted combination of the node input(s). The activation function is optionally linear, rectified linear unit, sigmoid, hyperbolic tangent, or of other types. In some embodiments, a network bias term b is added to the linear weighted combination of the node input(s) from the previous layer before the activation function is applied.

A model training module 304 (FIGS. 3A and 3B) is applied to calibrate all of the weights w for each layer 502 of the phishing detection model 302 using training data 308 which are provided in the input layer 502. A training process typically includes two steps, forward propagation and backward propagation, which are repeated multiple times until a predefined convergence condition is satisfied. In the forward propagation, the set of weights for different layers 502 are applied to the input data and intermediate results from the previous layers. In the backward propagation, a margin of error of the output (e.g., a loss function) is measured, and the weights w are adjusted accordingly to decrease the error. In some embodiments, the network bias b is applied at each node to provide a perturbation that helps the phishing detection model 302 avoid overfitting the training data 308. The result of training includes the network bias parameter b for each layer 502.

In one example, the phishing detection model 302 includes an input layer 502I, an output layer 5020, three convolutional layers, three max pooling layers, a flattening layer, four dense neural layers, and three dropout layers. In some embodiments, the input layer 502I has 3 channels and is configured to receive a screenshot image 326 having a resolution of 1600×1200 pixels. The three convolutional layers and three max pooling layers form an encoder network to refine and distill information in the screenshot images 326 and the context information 334 (FIGS. 3A and 3B). The hidden layers 502H are configured to refine relational features such as the bounding boxes in the login page, the username and password areas within the screenshot images 326. The output layer 5020 includes a classification layer configured to output a phishing indicator 328 representing a confidence level of determining that the resource would cause a phishing attack. The phishing indicator 328 is in a range that is defined by a first value (e.g., "0") and a second value (e.g., "1") inclusively. The first value indicates that the resource corresponding to the screenshot image 326 is associated with an authorized organization and would not cause the phishing attack. The second value indicates that the resource corresponding to the screenshot image 326 is associated with an unauthorized organization and would definitely cause the phishing attack.

In some embodiments, the training data 308 include one or more reference screenshot images 309A provided by one or more authorized organizations, e.g., screenshot images of the authorized organizations' authentic login web pages. Alternatively, in some embodiments, the training data 308 include phishing screenshot images 309B that are not provided by any authorized organization. In some embodiments, the phishing screenshot images 309B of the training data 308 are provided by a brand search service of a URL and website scanner. For example, a service may provide 64 screenshots of phishing web pages targeted at the authorized organization. In some embodiments, the phishing screenshot images 309B of the training data 308 include screenshot images collected from external data sources (e.g., an open data source, a third-party vendor service). For example, such data sources provide 781 screenshot images. In some embodiments, data augmentation techniques are applied to create phishing screenshot images 309B (e.g., 2700 phishing screenshot images). In an example, the training data 308 include more than 3,500 screenshot images applied to train the phishing detection model in a reliable manner. In some embodiments, the screenshot images 326 are accumulated over time and re-applied as training data 308 to improve the phishing detection model 302 on one or more aspects of: a detection time, a processing time, storage efficiency, and data security.

Referring to FIG. 5A, in some embodiments, the phishing detection model 302 has an F1 score up to 0.9 or above and an accuracy level of 87%. The F1 score is a phishing detection evaluation metric that assesses the predictive skill of the model 302 by elaborating on its class-wise performance rather than an overall performance as done by accuracy. F1 score combines precision and recall scores of the model 302. The precision and recall scores are determined based on a number of samples correctly predicted as the second value (e.g., “1”), a number of samples wrongly predicted as the second value, a number of samples correctly predicted as first value (e.g., “0”), and a number of samples wrongly predicted as the first value. In an example, testing against “in the wild” (ITW) for two weeks results in an F1 score of 0.87 and an accuracy of 98%. In some embodiments, the system is configured to analyze over 20-25 thousand potentially malicious URLs per week. Example metrics and performances of the phishing detection model 302 (exclusions for unknowns) are listed in Tables 1 and 2 (FIG. 5B).

FIG. 6 is an example electronic message 600 including an alert message 330 regarding detection of phishing login pages, in accordance with some embodiments. A body of the electronic message 600 includes the alert message 330 briefly describing what is found and requesting further review and determination. The electronic message 600 may include attached images (e.g., 137 images), one of which is shown in the electronic message 600. The screenshot image 326 is identical to an authentic login webpage of an authorized organization except a domain name (e.g., JET.COM).

FIG. 7A is an example screenshot image 326 of an authentic login webpage of an authorized organization (e.g., ABC organization), in accordance with some embodiments, and FIGS. 7B and 7C are two example ROIs 700 and 720 on an authentic login webpage of an authorized organization, in accordance with some embodiments. This screenshot image 326 is also used as a reference screenshot image 309A associated with a respective ground truth indicator 315A equal to a first value (e.g., “0”) during training. In some embodiments, a username is automatically populated, and a user associated with the username needs to fill in “Email Password” and click on a “Continue” or “Sign in” affordance (FIGS. 7A and 7B). Referring to FIG. 7C, in some embodiments, the authentic login webpage is displayed as a session expires. The username is not displayed or requires re-entering, and a user associated with the session needs to fill in “Enter Password” and click on a “Sign in” affordance.

Figure 8A:
FIGS. 8A and 8B are two example ROIs on an authentic login webpage of an authorized organization, in accordance with some embodiments.
Figure 8B:
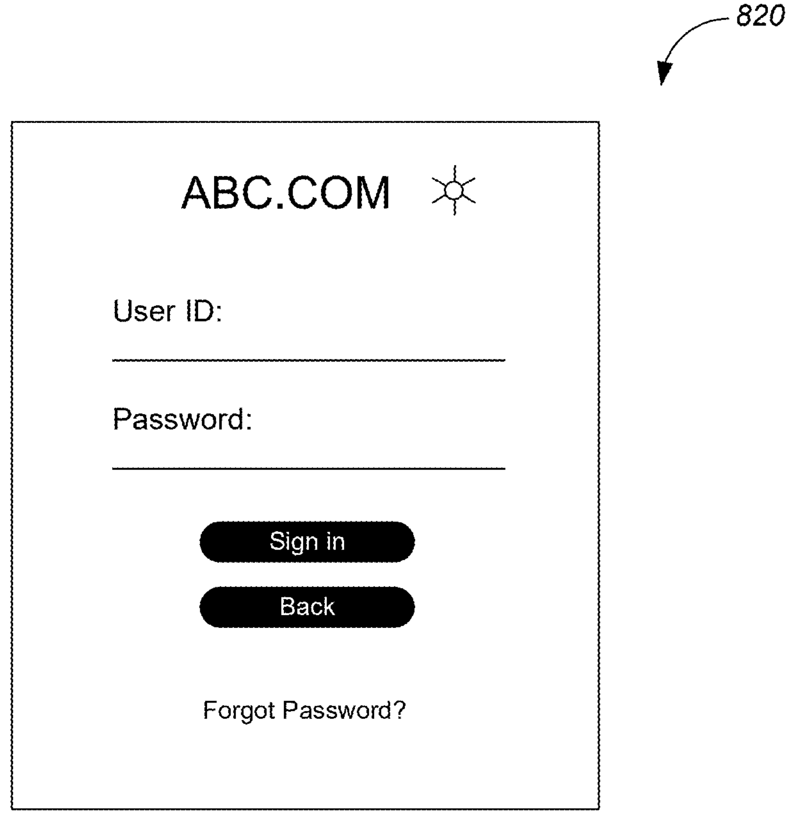
Figure 9A:
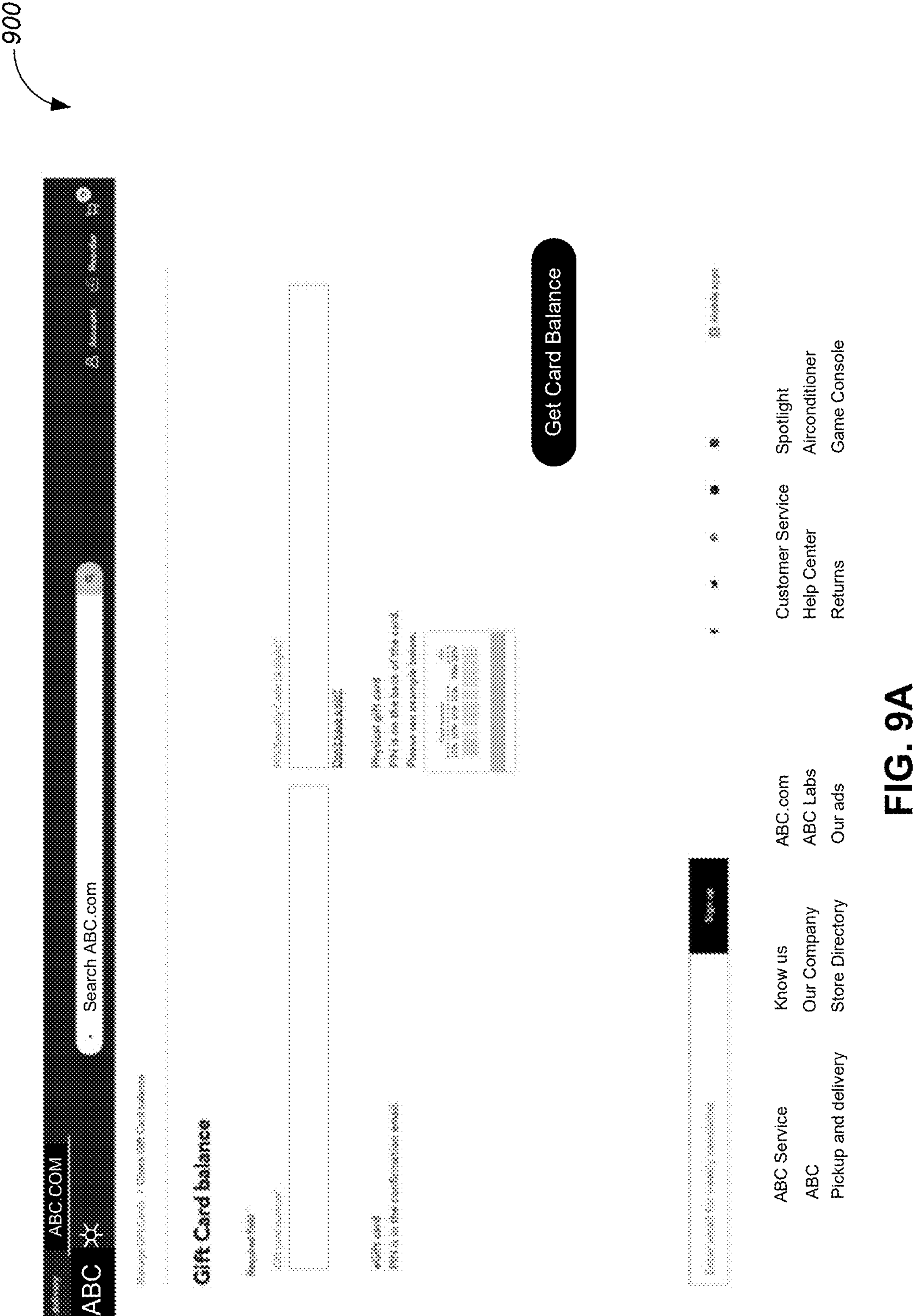
FIG. 9A is an example gift card webpage of an authorized organization, in accordance with some embodiments.
Figure 9B:
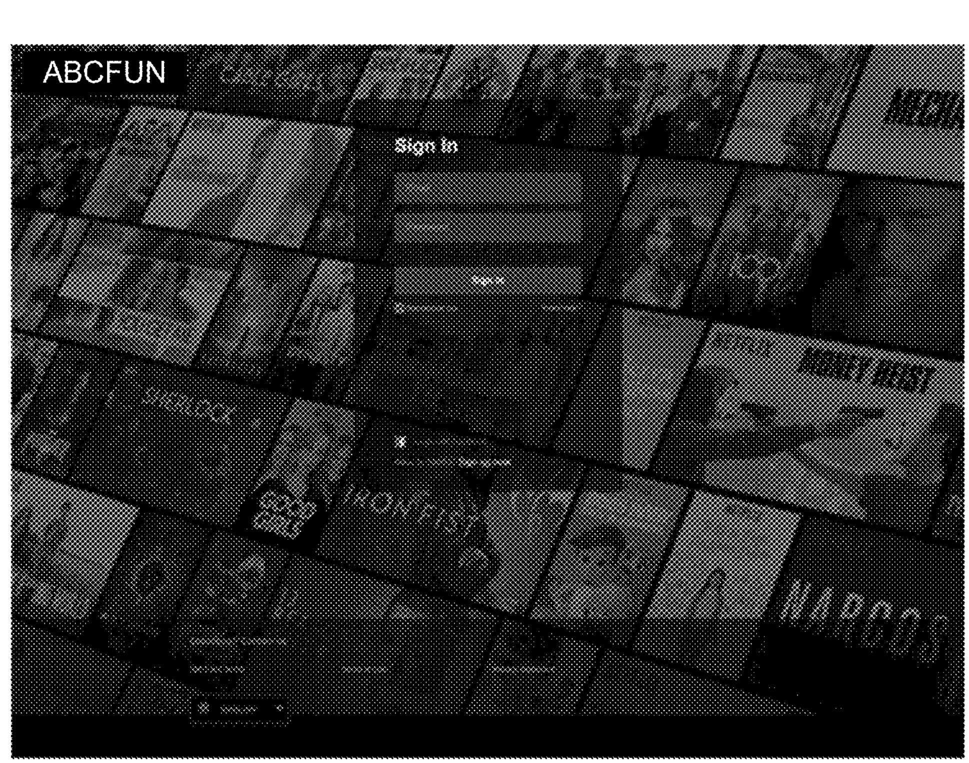
FIG. 9B is an example screenshot image of an authentic login webpage of an authorized organization, in accordance with some embodiments.
Figure 9C:
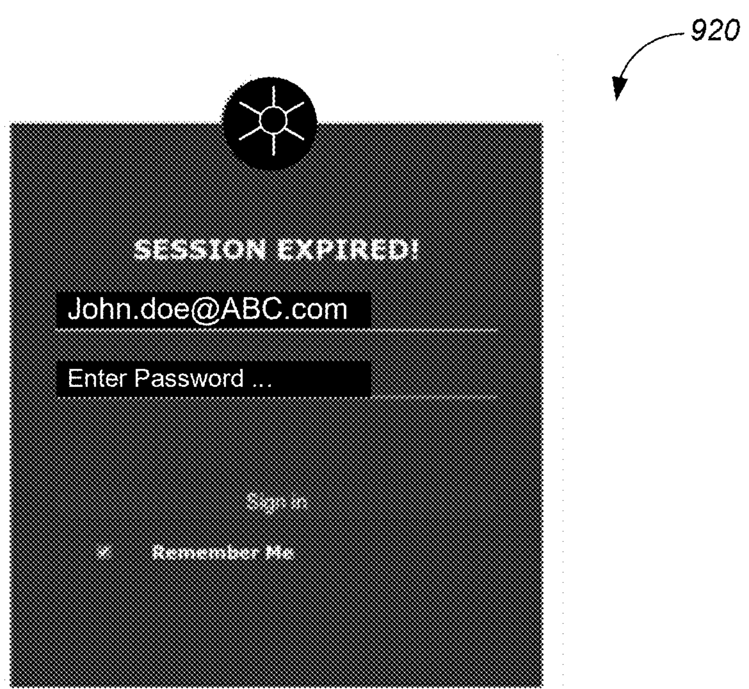
FIGS. 9C-9F are four example ROIs on phishing login webpages created by unauthorized organizations to mimic authentic login webpages, in accordance with some embodiments.
Figures 9D, 9E:
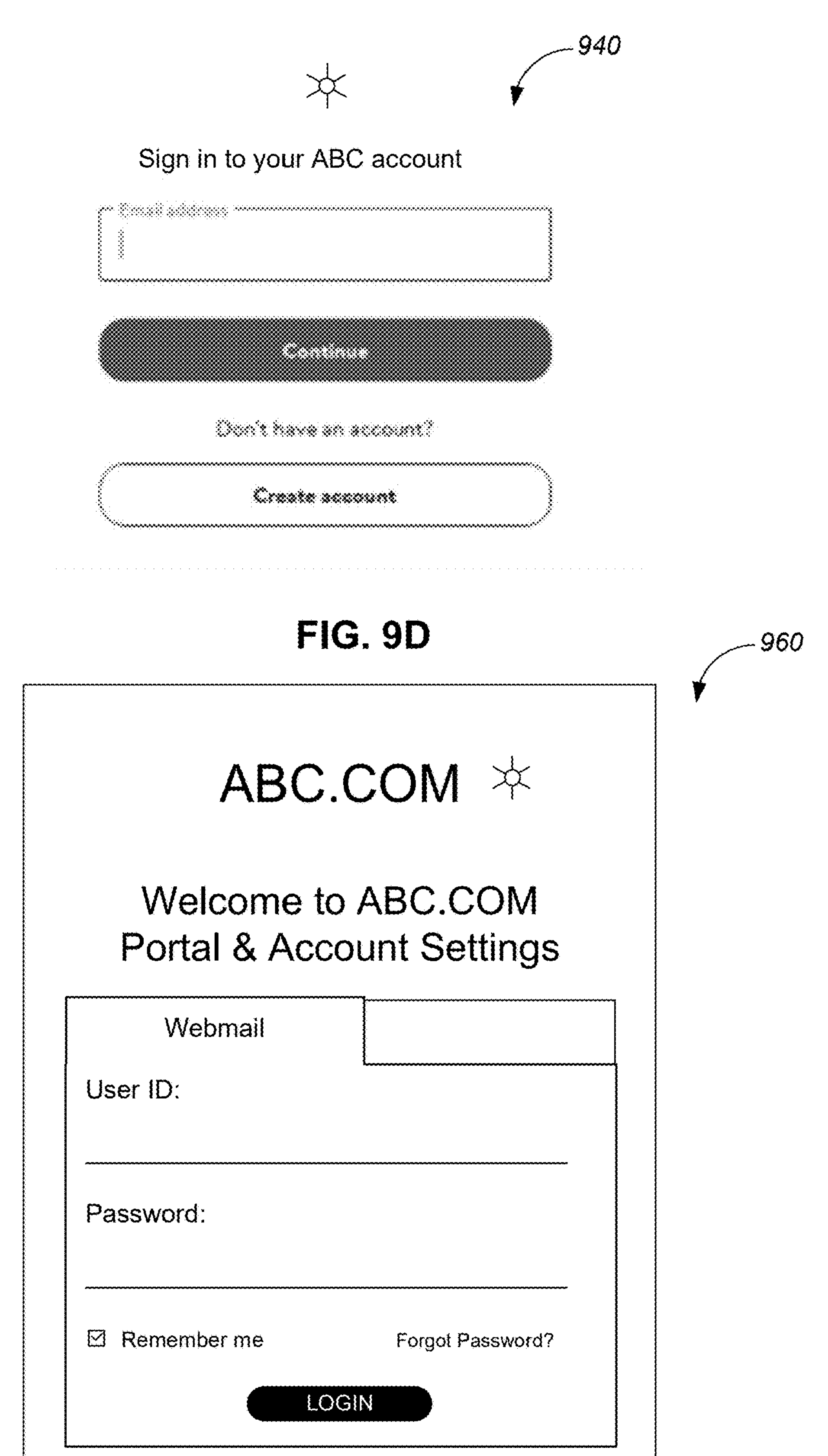
Figure 9F:
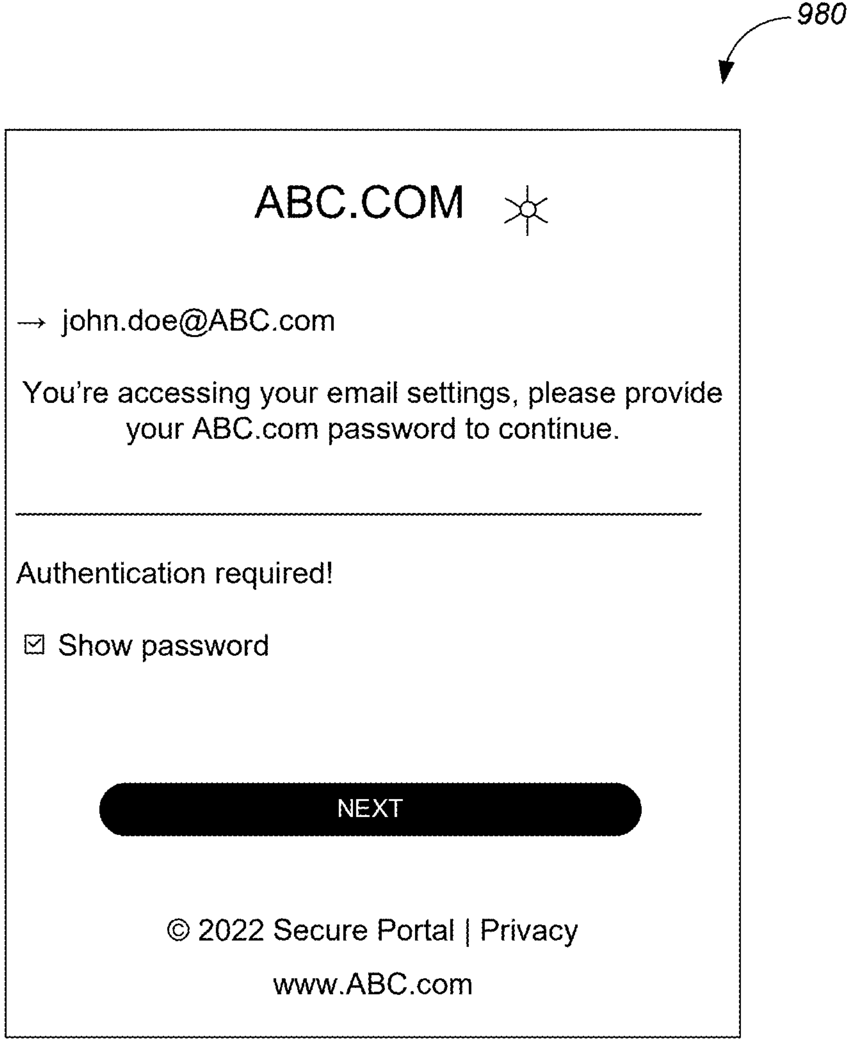

FIGS. 8A and 8B are two example ROIs 800 and 820 on an authentic login webpage of an authorized organization (e.g., ABC.com), in accordance with some embodiments. FIG. 9A is an example fraudulent gift card webpage 900 of an authorized organization, in accordance with some embodiments. FIG. 9B is an example screenshot image 326 of an authentic login webpage of an authorized organization (e.g., ABCFUN), in accordance with some embodiments. FIGS. 9C-9F are four example ROIs 920, 940, 960, and 980 on phishing login webpages created by unauthorized organizations to mimic authentic login webpages, in accordance with some embodiments. Screenshot images 326 of these web pages include an ROI further including a predefined target field, and the predefined target field includes one or more of: a user name field, an email address field, a Gift Card number field, a brand name, a PIN field, a password field, a “Sign In” affordance, a “Remember Me” affordance, a “Continue” affordance, and a “Create Account” affordance. In some embodiments, the ROI is extracted and processed by a phishing detection model 302. In some embodiments, the entire screenshot image including the ROI is processed by a phishing detection model 302.

Figure 10:
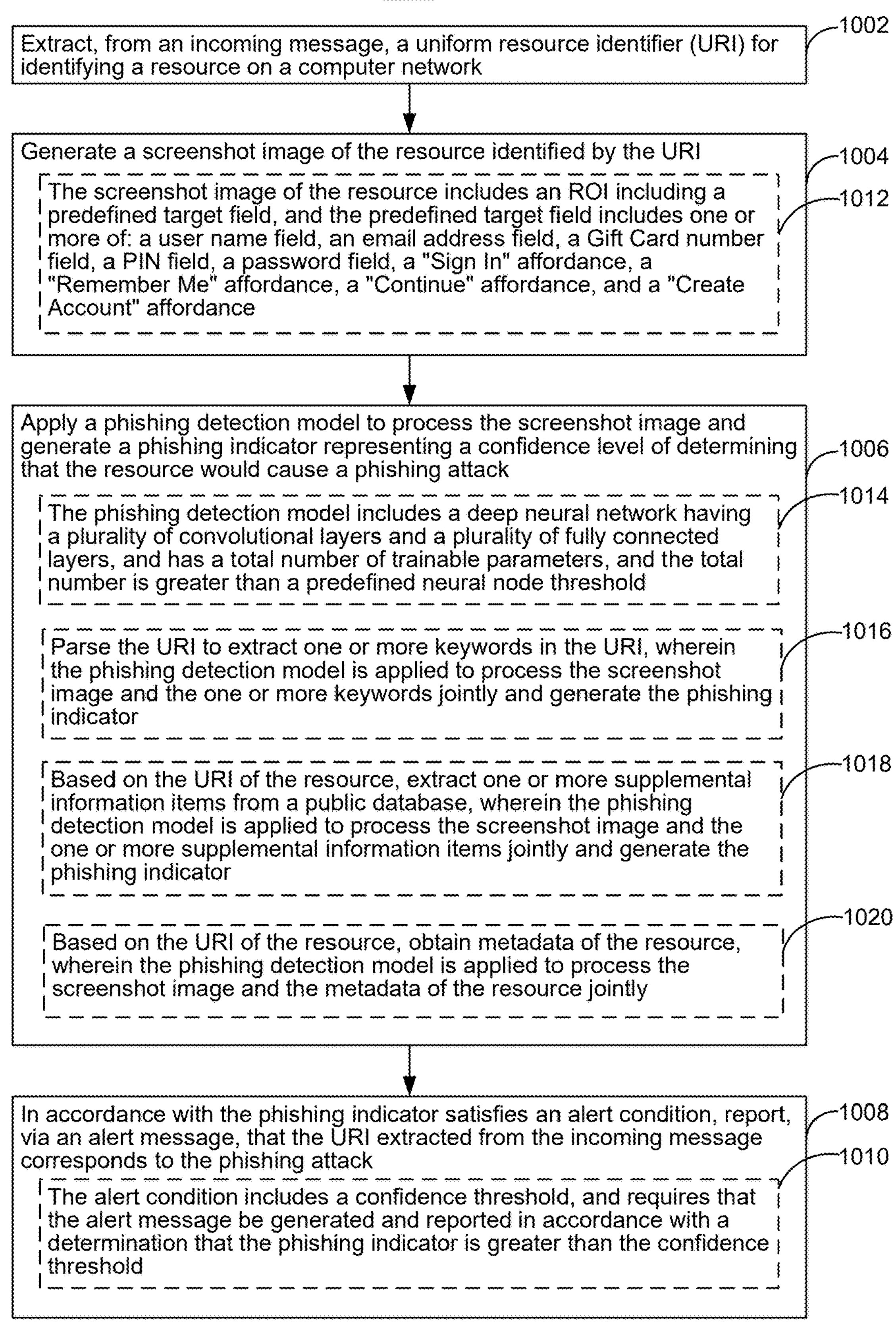
FIG. 10 is a flowchart illustrating an exemplary method for detecting phishing attacks, in accordance with some embodiments of the present teaching.

FIG. 10 is a flowchart illustrating an exemplary method 1000 for detecting phishing attacks, in accordance with some embodiments of the present teaching. Method 1000 is, optionally, governed by instructions that are stored in a non-transitory computer readable storage medium and that are executed by one or more processors of a system (e.g., including a computing device 200). Each of the operations shown in FIG. 10 may correspond to instructions stored in a computer memory or non-transitory computer readable storage medium (e.g., memory 202 in FIG. 2). The computer readable storage medium may include a magnetic or optical disk storage device(s), solid state storage device(s) such as Flash memory, or other non-volatile memory device(s). The instructions stored on the computer readable storage medium may include one or more of: source code, assembly language code, object code, or other instruction format that is interpreted by one or more processors. Some operations in method 1000 may be combined and/or the order of some operations may be changed.

Method 1000 is performed by a system (e.g., phishing detection computing device 102). The system extracts (1002), from an incoming message 324, a uniform resource identifier (URI) 322 for identifying a resource on a computer network and generates (1004) a screenshot image 326 of the resource identified by the URI 322. The system applies (1006) a phishing detection model 302 to process the screenshot image 326 and generate a phishing indicator 328 representing a confidence level of determining that the resource would cause a phishing attack. In accordance with the phishing indicator 328 satisfies (1008) an alert condition, the system reports, via an alert message, that the URI 322 extracted from the incoming message 324 corresponds to the phishing attack. In some embodiments, the resource includes a web page and the URI 322 includes a uniform resource locator (URL) of the web page. The system obtains the incoming message 324 including the URL and sends an access request including the URL to the Internet. The screenshot image 326 captures the web page configured to be loaded at a browser in response to the access request.

In some embodiments, the alert condition includes (1010) a confidence threshold, and requires that the alert message be generated and reported in accordance with a determination that the phishing indicator 328 is greater than the confidence threshold. Further, in some embodiments, the system determines a portion (e.g., 10%) of a resource pool to be reported and adjusts the confidence threshold based on the portion. For example, the higher the portion of the resource pool, the higher the confidence threshold.

In some embodiments, the system generates the screenshot image 326 of the resource identified by the URI 322 by cropping the screenshot image 326 of the resource based on a region of interest (ROI) including one or more predefined target fields, adjusting the screenshot image 326 of the resource based on a predefined image resolution, or both.

In some embodiments, the screenshot image 326 of the resource includes (1012) an ROI including a predefined target field, and the predefined target field includes one or more of: a user name field, an email address field, a Gift Card number field, a brand name, a PIN field, a password field, a "Sign In" affordance, a "Remember Me" affordance, a "Continue" affordance, and a "Create Account" affordance.

In some embodiments, referring to FIG. 5A, the phishing detection model 302 includes (1014) a deep neural network having a plurality of convolutional layers and a plurality of fully connected layers, and has a total number of trainable parameters, and the total number is greater than a predefined neural node threshold (e.g., $2\times10^8$).

In some embodiments, the system obtains a plurality of training images 309 and a plurality of ground truth indicators 315 and trains the phishing detection model 302 using the plurality of training images 309. Each training image 309 uniquely associated with a respective ground truth indicator 315 indicating whether the respective image 309 would cause the phishing attack. Further, in some embodiments, the plurality of training images 309 further includes a set of one or more reference images 309A each of which associated with a respective ground truth indicator 315A equal to a first value, which indicates that each of the set of one or more reference images 309A includes a screenshot of a respective web page of one or more authorized organizations. In some embodiments, the plurality of training images 309 further include a set of phishing screenshot images 309B each of which associated with a respective ground truth indicator 315B equal to a second value, which indicates that each of the set of phishing screenshot images 309B includes a screenshot of a respective web page that is not provided by any authorized organization.

In some embodiments, the confidence level represented by the phishing indicator 328 is in a range that is defined by a first value and a second value inclusively. The first value indicates that the resource corresponding to the screenshot image 326 is associated with an authorized organization and would not cause the phishing attack. The second value indicates that the resource corresponding to the screenshot image 326 is associated with an unauthorized organization and would definitely cause the phishing attack.

In some embodiments, the system parses (1016) the URI 322 to extract one or more keywords 334A in the URI 322, and the phishing detection model 302 is applied to process the screenshot image 326 and the one or more keywords 334A jointly and generate the phishing indicator 328.

In some embodiments, based on the URI 322 of the resource, the system extracts (1018) one or more supplemental information items 334B from a supplemental information database 336, and the phishing detection model 302 is applied to process the screenshot image 326 and the one or more supplemental information items 334B jointly and generate the phishing indicator 328. Further, in some embodiments, the system parses the URI 322 to extract one or more keywords 334A in the URI 322. The one or more supplemental information items 334B are extracted from the supplemental information database 336 based on the one or more keywords 334A.

In some embodiments, based on the URI 322 of the resource, the system obtains (1020) metadata 334C of the resource, and the phishing detection model 302 is applied to process the screenshot image 326 and the metadata 334C of the resource jointly.

In some embodiments, the phishing detection model 302 is applied to process the screenshot image 326 and one or more of: one or more keywords 334A of the URI 322, one or more supplemental information items 334B obtained from a supplemental information database 336, and metadata 334C of the resource.

In some embodiments, the URI 322 identifies the resource on the computer network based on an application layer protocol selected from a group consisting of: Hypertext Transfer Protocol (HTTP), Hypertext Transfer Protocol Secure (HTTPS), File Transfer Protocol (FTP), and a Secure Shell Protocol (SSH).

In some embodiments, additional context information 334' (FIG. 4) is collected and processed by the phishing detection model 302 jointly with the screenshot images 326. For example, the context information 334' includes brand abuse domains and faux domain output 408 identified by a third-party service. Further, in some embodiments, the screenshot images 326, context information 334, 334', the phishing indicator 328, and/or alert messages 330 are stored in a database 116. For example, the database 116 is provided by one or more third-party storage services that stores structured or unstructured data. In some embodiments, a comprehensive alerting system is applied with an interface that would allow security analysts to take actions more efficiently. In some embodiments, additional assuring feedback is provided using an ImageHash algorithm. In some embodiments, additional assuring feedback is provided based on ensemble learning models combined with some pre-trained DNN.

It should be understood that the particular order in which the operations in FIG. 10 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to FIGS. 4-8 are also applicable in an analogous manner to method 1000 described above with respect to FIG. 10. For brevity, these details are not repeated here.

Figure 11:
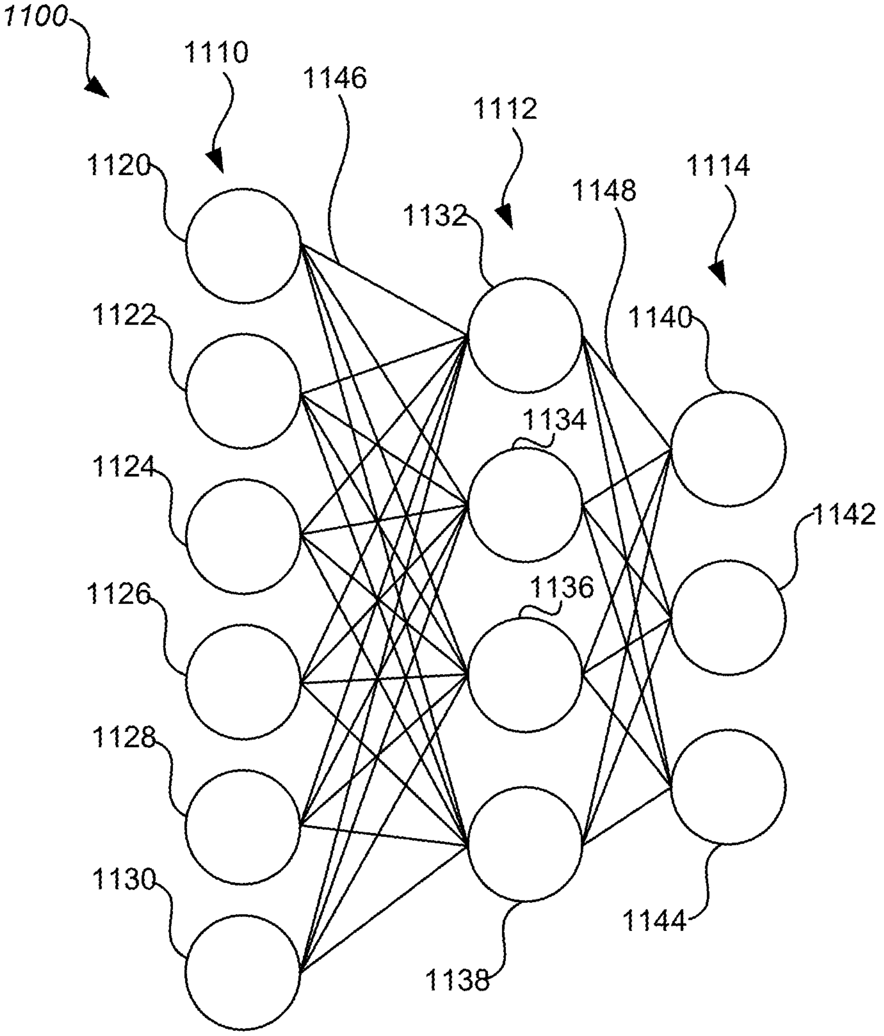
FIG. 11 illustrates an artificial neural network, in accordance with some embodiments.

FIG. 11 illustrates an artificial neural network 1100, in accordance with some embodiments. Alternative terms for "artificial neural network" are "neural network," "artificial neural net," "neural net," or "trained function." The neural network 1100 comprises nodes 1120-1144 and edges 1146-1148, wherein each edge 1146-1148 is a directed connection from a first node 1120-1138 to a second node 1132-144. In general, the first node 1120-1138 and the second node 1132-1144 are different nodes, although it is also possible that the first node 1120-1138 and the second node 1132-1144 are identical. For example, in FIG. 3 the edge 1146 is a directed connection from the node 1120 to the node 1132, and the edge 1148 is a directed connection from the node 1132 to the node 1140. An edge 1146-1148 from a first node 1120-1138 to a second node 1132-1144 is also denoted as "ingoing edge" for the second node 1132-1144 and as "outgoing edge" for the first node 1120-1138.

The nodes 1120-1144 of the neural network 1100 may be arranged in layers 1110-1114, wherein the layers may comprise an intrinsic order introduced by the edges 1146-1148 between the nodes 1120-144 such that edges 1146-1148 exist only between neighboring layers of nodes. In the illustrated embodiment, there is an input layer 1110 comprising only nodes 1120-1130 without an incoming edge, an output layer 1114 comprising only nodes 1140-1144 without outgoing edges, and a hidden layer 1112 in-between the input layer 1110 and the output layer 1114. In general, the number of hidden layers 1112 may be chosen arbitrarily and/or through training. The number of nodes 1120-1130 within the input layer 1110 usually relates to the number of input values of the neural network, and the number of nodes 1140-1144 within the output layer 1114 usually relates to the number of output values of the neural network.

In particular, a (real) number may be assigned as a value to every node 1120-1144 of the neural network 1100. Here, $$x_i^{(n)}$$

denotes the value of the i-th node 1120-1144 of the n-th layer 1110-1114. The values of the nodes 1120-1130 of the input layer 1110 are equivalent to the input values of the neural network 1100, the values of the nodes 1140-1144 of the output layer 1114 are equivalent to the output value of the neural network 1100. Furthermore, each edge 1146-1148 may comprise a weight being a real number, in particular, the weight is a real number within the interval [−1, 1], within the interval [0, 1], and/or within any other suitable interval. Here, $$w_{i,j}^{(m,n)}$$

denotes the weight of the edge between the i-th node 1120-1138 of the m-th layer 1110, 1112 and the j-th node 1132-1144 of the n-th layer 1112, 1114. Furthermore, the abbreviation $$w_{i,j}^{(n)}$$

is defined for the weight $$w_{i,j}^{(n,n+1)}.$$

In particular, to calculate the output values of the neural network 1100, the input values are propagated through the neural network. In particular, the values of the nodes 1132-1144 of the (n+1)-th layer 1112, 1114 may be calculated based on the values of the nodes 1120-1138 of the n-th layer 1110, 1112 by equation (1) in FIG. 16A. Herein, the function $f$ is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 1110 are given by the input of the neural network 1100, wherein values of the hidden layer(s) 1112 may be calculated based on the values of the input layer 1110 of the neural network and/or based on the values of a prior hidden layer, etc.

In order to set the values $$w_{i,j}^{(m,n)}$$

for the edges, the neural network 1100 has to be trained using training data. In particular, training data comprise training input data and training output data. For a training step, the neural network 1100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 1100 (backpropagation algorithm). In particular, the weights are changed according to equation (2) in FIG. 16B, wherein γ is a learning rate, and the numbers $$\delta_j^{(n)}$$

may be recursively calculated as equation (3) in FIG. 16C based on $$\delta_j^{(n+1)},$$

if the (n+1)-th layer is not the output layer, and equation (4) in FIG. 16D if the (n+1)-th layer is the output layer 114, wherein f' is the first derivative of the activation function, and $$y_j^{(n+1)}$$

is the comparison training value for the j-th node of the output layer 1114.

Figure 12:
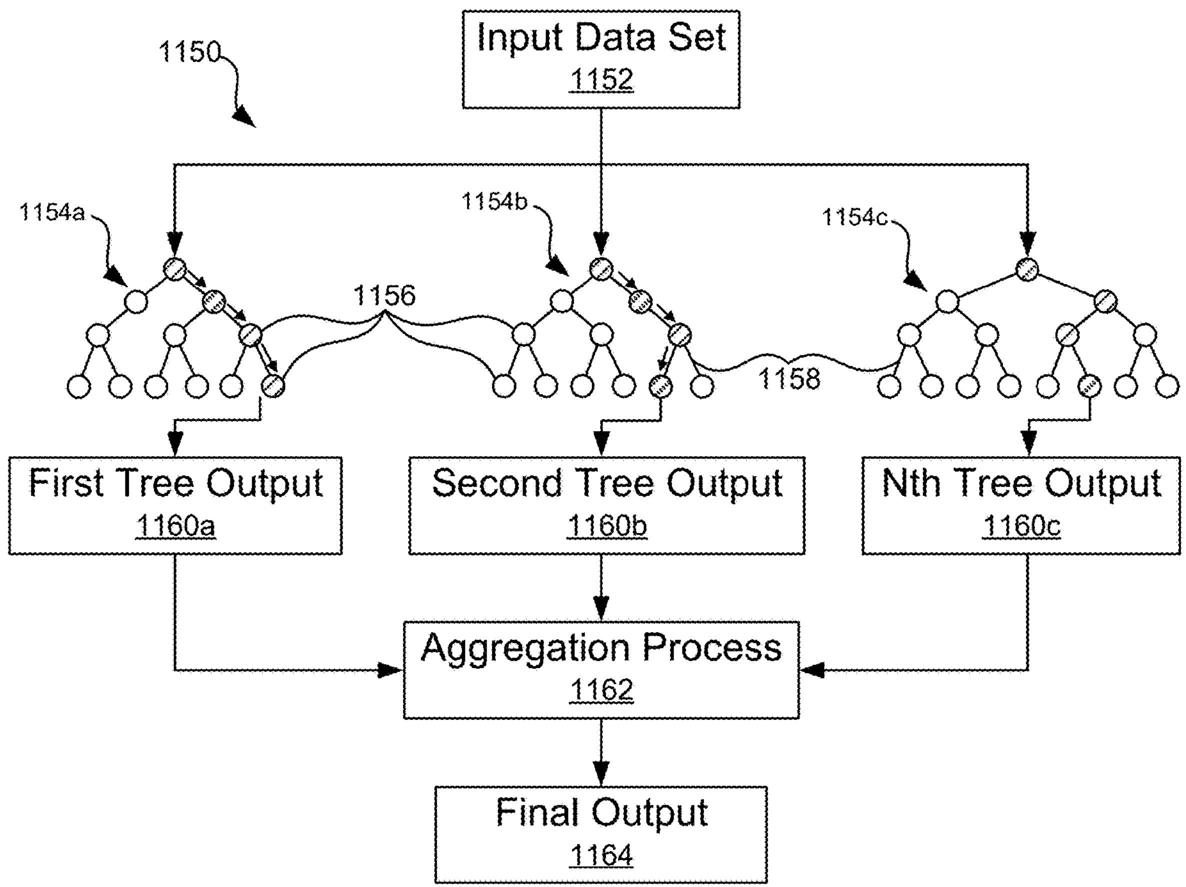
FIG. 12 illustrates a tree-based artificial neural network, in accordance with some embodiments.

FIG. 12 illustrates a tree-based neural network 1150, in accordance with some embodiments. In particular, the tree-based neural network 1150 is a random forest neural network, though it will be appreciated that the discussion herein is applicable to other decision tree neural networks. The tree-based neural network 1150 includes a plurality of trained decision trees 1154*a*-1154*c* each including a set of nodes 1156 (also referred to as "leaves") and a set of edges 1158 (also referred to as "branches").

Each of the trained decision trees 1154*a*-1154*c* may include a classification and/or a regression tree (CART). Classification trees include a tree model in which a target variable may take a discrete set of values, e.g., may be classified as one of a set of values. In classification trees, each leaf 1156 represents class labels and each of the branches 1158 represents conjunctions of features that connect the class labels. Regression trees include a tree model in which the target variable may take continuous values (e.g., a real number value).

In operation, an input data set 1152 including one or more features or attributes is received. A subset of the input data set 152 is provided to each of the trained decision trees 1154*a*-1154*c*. The subset may include a portion of and/or all of the features or attributes included in the input data set 1152. Each of the trained decision trees 1154*a*-1154*c* is trained to receive the subset of the input data set 1152 and generate a tree output value 1160*a*-1160*c*, such as a classification or regression output. The individual tree output value 1160*a*-1160*c* is determined by traversing the trained decision trees 1154*a*-1154*c* to arrive at a final leaf (or node) 1156.

In some embodiments, the tree-based neural network 1150 applies an aggregation process 1162 to combine the output of each of the trained decision trees 1154*a*-1154*c* into a final output 1164. For example, in embodiments including classification trees, the tree-based neural network 1150 may apply a majority-voting process to identify a classification selected by the majority of the trained decision trees 1154*a*-1154*c*. As another example, in embodiments including regression trees, the tree-based neural network 1150 may apply an average, mean, and/or other mathematical process to generate a composite output of the trained decision trees. The final output 1164 is provided as an output of the tree-based neural network 1150.

Figure 13:
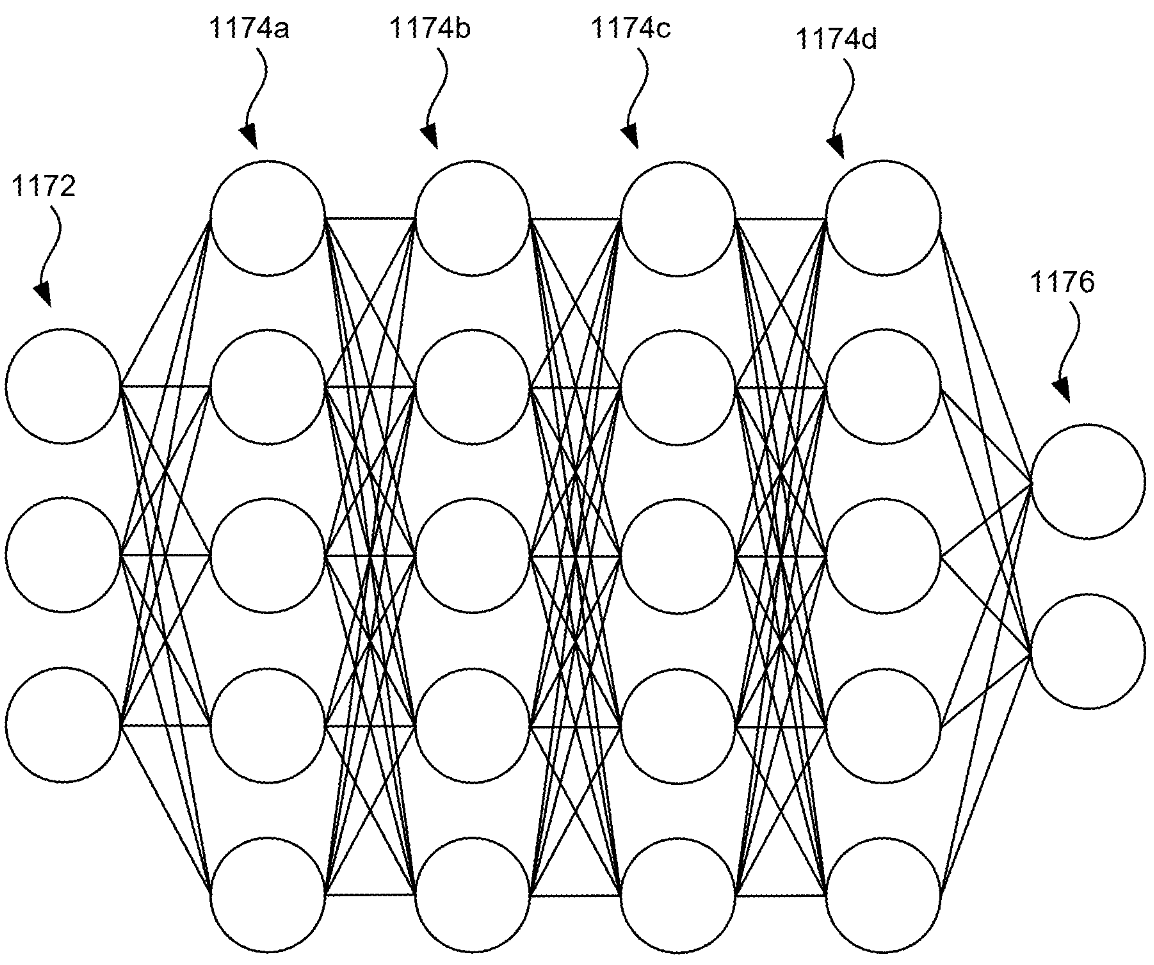
FIG. 13 illustrates a deep neural network (DNN), in accordance with some embodiments.

FIG. 13 illustrates a deep neural network (DNN) 1170, in accordance with some embodiments. The DNN 1170 is an artificial neural network, such as the neural network 1100 illustrated in conjunction with FIG. 11, that includes representation learning. The DNN 1170 may include an unbounded number of (e.g., two or more) intermediate layers 1174*a*-1174*d* each of a bounded size (e.g., having a predetermined number of nodes), providing for practical application and optimized implementation of a universal classifier. Each of the layers 1174*a*-1174*d* may be heterogenous. The DNN 1170 may be configured to model complex, non-linear relationships. Intermediate layers, such as intermediate layer 1174*c*, may provide compositions of features from lower layers, such as layers 1174*a*, 1174*b*, providing for modeling of complex data.

In some embodiments, the DNN 1170 may be considered a stacked neural network including multiple layers each configured to execute one or more computations. The computation for a network with L hidden layers may be denoted as equation (5) in FIG. 16E, where $a^{(l)}(x)$ is a preactivation function and $h^{(l)}(x)$ is a hidden-layer activation function providing the output of each hidden layer. The preactivation function $a^{(l)}(x)$ may include a linear operation with matrix $W^{(l)}$ and bias $b^{(l)}$ according to equation (6) in FIG. 16F.

In some embodiments, the DNN 1170 is a feedforward network in which data flow from an input layer 1172 to an output layer 1176 without looping back through any layers. In some embodiments, the DNN 1170 may include a backpropagation network in which the output of at least one hidden layer is provided, e.g., propagated, to a prior hidden layer. The DNN 1170 may include any suitable neural network, such as a self-organizing neural network, a recurrent neural network, a convolutional neural network, a modular neural network, and/or any other suitable neural network.

In some embodiments, a DNN 1170 may include a neural additive model (NAM). An NAM includes a linear combination of networks, each of which attends to (e.g., provides a calculation regarding) a single input feature. For example, a NAM may be represented as equation (7) in FIG. 16G, where β is an offset and each $f_i$ is parametrized by a neural network. In some embodiments, the DNN 1170 may include a neural multiplicative model (NMM), including a multiplicative form for the NAM mode using a log transformation of the dependent variable y and the independent variable x as shown in equation (8) in FIG. 16H, where d represents one or more features of the independent variable x.

It will be appreciated that automated phishing detections and alerting, as disclosed herein, particularly for large platforms such as e-commerce network platforms, is only possible with the aid of computer-assisted machine-learning algorithms and techniques, such as the disclosed phishing detection model 302. In some embodiments, phishing detection processes including the trained phishing detection model 302 are used to perform operations that cannot practically be performed by a human, either mentally or with assistance, such as automated detection of phishing URIs and automated generation of alerts reporting the same. It will be appreciated that a variety of phishing detection techniques can be used alone or in combination to generate confidence thresholds regarding a determination of whether a URI represents a phishing attempt.

Figure 14:
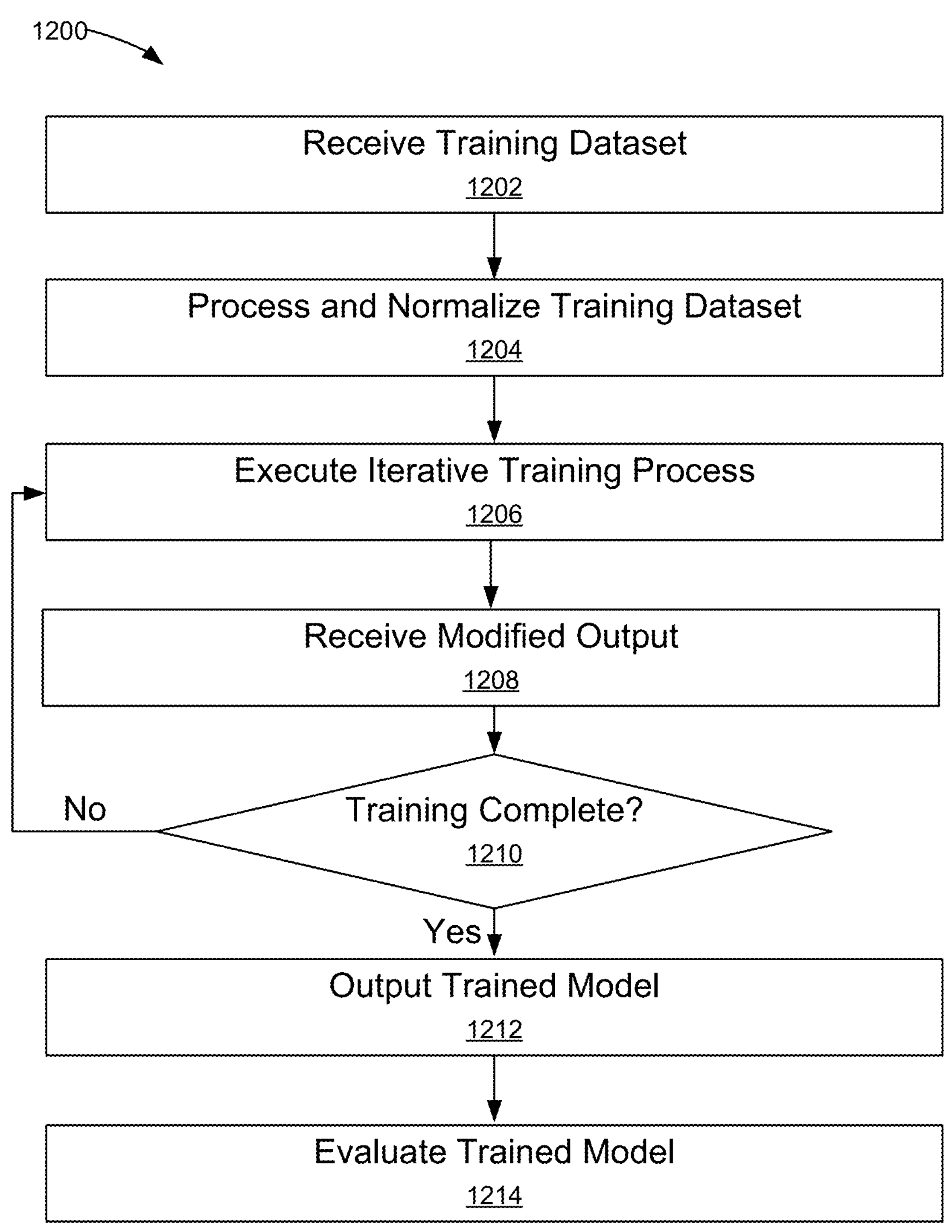
FIG. 14 is a flowchart illustrating a training method for generating a trained machine learning model, in accordance with some embodiments.
Figure 15:
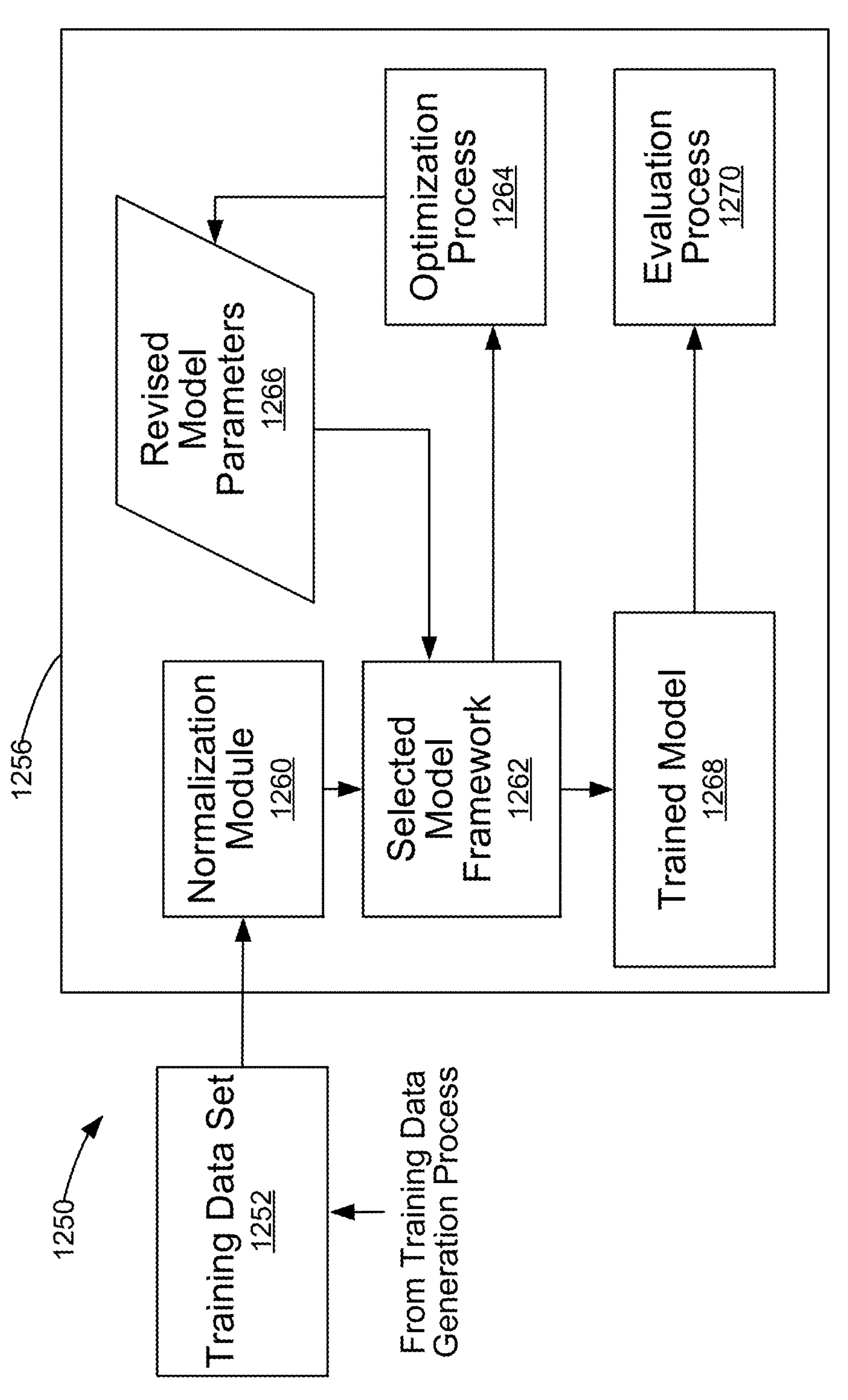
FIG. 15 is a process flow illustrating various steps of the training method of FIG. 14, in accordance with some embodiments.

In some embodiments, a phishing detection method can include and/or implement one or more trained models, such as a trained phishing detection model 302. In some embodiments, one or more trained models can be generated using an iterative training process based on a training dataset. FIG. 14 illustrates a method 1200 for generating a trained model, such as a trained optimization model, in accordance with some embodiments. FIG. 15 is a process flow 1250 illustrating various steps of the method 1200 of generating a trained model, in accordance with some embodiments. At step 1202, a training dataset 1252 is received by a system, such as a processing device 10. The training dataset 1252 can include labeled and/or unlabeled data. For example, in some embodiments, a set of training data is provided for use in training a model, as discussed above.

At optional step 1204, the received training dataset 1252 is processed and/or normalized by a normalization module 1260. For example, in some embodiments, the training dataset 1252 can be augmented by imputing or estimating missing values or features of one or more screenshots.

At step 1206, an iterative training process is executed to train a selected model framework 1262. The selected model framework 1262 can include an untrained (e.g., base) phishing detection model, such as a DNN-based framework and/or a partially or previously trained model (e.g., a prior version of a trained model). The training process is configured to iteratively adjust parameters (e.g., hyperparameters) of the selected model framework 1262 to minimize a cost value (e.g., an output of a cost function) for the selected model framework 1262.

The training process is an iterative process that generates set of revised model parameters 1266 during each iteration. The set of revised model parameters 1266 can be generated by applying an optimization process 1264 to the cost function of the selected model framework 1262. The optimization process 1264 can be configured to reduce the cost value (e.g., reduce the output of the cost function) at each step by adjusting one or more parameters during each iteration of the training process.

After each iteration of the training process, at step 1208, a determination is made whether the training process is complete. The determination at step 1208 can be based on any suitable parameters. For example, in some embodiments, a training process can complete after a predetermined number of iterations. As another example, in some embodiments, a training process can complete when it is determined that the cost function of the selected model framework 1262 has reached a minimum, such as a local minimum and/or a global minimum.

At step 1210, a trained model 1268 is output and provided for use in phishing detection. At optional step 1212, a trained model 1268 can be evaluated by an evaluation process 1270. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:

a non-transitory memory having instructions stored thereon; and at least one processor operatively coupled to the non-transitory memory, and configured to read the instructions to:

extract, in response to receiving and from an incoming message, a uniform resource identifier (URI) for identifying a resource on a computer network;

in response to extracting the URI, generate a screenshot image of the resource identified by the URI;

apply a trained phishing detection model to process the screenshot image and generate a phishing indicator representing a confidence level of determining that the resource cause a phishing attack; and in accordance with a determination that the phishing indicator satisfies an alert condition, generate an alert message indicating that the URI extracted from the incoming message corresponds to the phishing attack;

wherein the trained phishing detection model is trained using a plurality of training images and a plurality of ground truth indicators, each training image uniquely associated with a respective ground truth indicator indicating whether the respective image cause the phishing attack.

2. The system of claim 1, wherein the resource includes a web page and the URI includes a uniform resource locator (URL) of the web page, the at least one processor further configured to read the instructions to:

obtain the incoming message including the URL; and send an access request including the URL;

wherein the screenshot image captures the web page configured to be loaded at a browser in response to the access request.

3. The system of claim 1, wherein the alert condition includes a confidence threshold and requires that the alert message be generated in accordance with a determination that the phishing indicator is greater than the confidence threshold.

4. The system of claim 3, the at least one processor further configured to read the instructions to:

determine a portion of a resource pool to be reported; and adjust the confidence threshold based on the portion of the resource pool.

5. The system of claim 1, wherein generating the screenshot image of the resource identified by the URI further comprises one or more of:

cropping the screenshot image of the resource based on a region of interest (ROI) including one or more predefined target fields; and adjusting the screenshot image of the resource based on a predefined image resolution.

6. The system of claim 1, wherein the screenshot image of the resource includes a region of interest (ROI) including a predefined target field, and the predefined target field includes one or more of: a user name field, an email address field, a Gift Card number field, a brand name, a PIN field, a password field, a "Sign In" affordance, a "Remember Me" affordance, a "Continue" affordance, and a "Create Account" affordance.

7. The system of claim 1, wherein the phishing detection model includes a deep neural network having a plurality of convolutional layers and a plurality of fully connected layers, and has a total number of trainable parameters greater than a predefined neural node threshold.

8. A non-transitory computer-readable storage medium, having instructions stored thereon, which when executed by one or more processors cause the processors to:

extract, in response to receiving and from an incoming message, a uniform resource identifier (URI) for identifying a resource on a computer network;

in response to extracting the URI, generate a screenshot image of the resource identified by the URI;

apply a phishing detection model to process the screenshot image and generate a phishing indicator representing a confidence level of determining that the resource cause a phishing attack; and in accordance with a determination that the phishing indicator satisfies an alert condition, generate an alert message indicating that the URI extracted from the incoming message corresponds to the phishing attack;

wherein the phishing detection model is trained using a plurality of training images and a plurality of ground truth indicators, each training image uniquely associated with a respective ground truth indicator indicating whether the respective image cause the phishing attack.

9. The non-transitory computer-readable storage medium of claim 8, wherein the resource includes a web page and the URI includes a uniform resource locator (URL) of the web page, the storage medium further comprising instructions for:

obtaining the incoming message including the URL; and sending an access request including the URL to the Internet;

wherein the screenshot image captures the web page configured to be loaded at a browser in response to the access request.

10. The non-transitory computer-readable storage medium of claim 8, wherein the plurality of training images further include a set of one or more reference images each of which associated with a respective ground truth indicator equal to a first value, which indicates that each of the set of one or more reference images includes a screenshot of a respective web page of one or more authorized organizations.

11. The non-transitory computer-readable storage medium of claim 8, wherein the plurality of training images further include a set of phishing screenshot images each of which associated with a respective ground truth indicator equal to a second value, which indicates that each of the set of phishing screenshot images includes a screenshot of a respective web page that is not provided by any authorized organization.

12. A method, comprising: at a system including a non-transitory memory having instructions stored thereon and at least one processor operatively coupled to the non-transitory memory and configured to read the instructions:

extracting, in response to receiving and from an incoming message, a uniform resource identifier (URI) for identifying a resource on a computer network;

in response to extracting the URI, generating a screenshot image of the resource identified by the URI;

applying a phishing detection model to process the screenshot image and generate a phishing indicator representing a confidence level of determining that the resource cause a phishing attack; and in accordance with a determination that the phishing indicator satisfies an alert condition, generating an alert message indicating that the URI extracted from the incoming message corresponds to the phishing attack;

wherein the phishing detection model is trained using a plurality of training images and a plurality of ground truth indicators, each training image uniquely associated with a respective ground truth indicator indicating whether the respective image cause the phishing attack.

13. The method of claim 12, wherein:

the confidence level represented by the phishing indicator is in a range that is defined by a first value and a second value inclusively;

the first value indicates that the resource corresponding to the screenshot image is associated with an authorized organization and does not cause the phishing attack; and the second value indicates that the resource corresponding to the screenshot image is associated with an unauthorized organization and definitely cause the phishing attack.

14. The method of claim 12, the at least one processor further configured to read the instructions to parse the URI to extract one or more keywords in the URI, wherein the phishing detection model is applied to process the screenshot image and the one or more keywords jointly and generate the phishing indicator.

15. The method of claim 12, the at least one processor further configured to read the instructions to, based on the URI of the resource, extract one or more supplemental information items from a supplemental information database, wherein the phishing detection model is applied to process the screenshot image and the one or more supplemental information items jointly and generate the phishing indicator.

16. The method of claim 15, the at least one processor further configured to read the instructions to parse the URI to extract one or more keywords in the URI, wherein the one or more supplemental information items are extracted from the supplemental information database based on the one or more keywords.

17. The method of claim 12, the at least one processor further configured to read the instructions to, based on the URI of the resource, obtain metadata of the resource, wherein the phishing detection model is applied to process the screenshot image and the metadata of the resource jointly.

18. The method of claim 12, wherein the phishing detection model is applied to process the screenshot image and one or more of: one or more keywords of the URI, one or more supplemental information items obtained from a supplemental information database, and metadata of the resource.

19. The method of claim 12, wherein the URI identifies the resource on the computer network based on an application layer protocol selected from a group consisting of: Hypertext Transfer Protocol (HTTP), Hypertext Transfer Protocol Secure (HTTPS), File Transfer Protocol (FTP), and a Secure Shell Protocol (SSH).

20. The system of claim 1, wherein the at least one processor is further configured to read the instructions to:

apply an image hashing algorithm to the screenshot image to compare the screenshot image with a set of reference images of known legitimate login pages.

* * * * *